(12) United States Patent
John Wilson et al.

(10) Patent No.: US 10,374,679 B2
(45) Date of Patent: Aug. 6, 2019

(54) DYNAMIC OVERRIDING OF CONTROL BEAM MONITORING CONFIGURATION

(71) Applicant: QUALCOMM Incorporated, San Diego, CA (US)

(72) Inventors: Makesh Pravin John Wilson, San Diego, CA (US); Tao Luo, San Diego, CA (US); Jing Sun, San Diego, CA (US); Andrei Dragos Radulescu, San Diego, CA (US); Aleksandar Damnjanovic, Del Mar, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/912,144

(22) Filed: Mar. 5, 2018

(65) Prior Publication Data

US 2018/0287686 A1     Oct. 4, 2018

Related U.S. Application Data

(60) Provisional application No. 62/480,340, filed on Mar. 31, 2017.

(51) Int. Cl.
*H04B 7/06* (2006.01)

(52) U.S. Cl.
CPC ......... *H04B 7/0632* (2013.01); *H04B 7/0617* (2013.01); *H04B 7/0626* (2013.01); *H04B 7/0695* (2013.01); *H04B 7/063* (2013.01)

(58) Field of Classification Search
CPC .... H04B 7/0695; H04B 7/088; H04B 7/0626; H04B 7/0617; H04B 7/0639;
(Continued)

(56) References Cited

U.S. PATENT DOCUMENTS 7,400,888 B2   7/2008  Smith et al.
9,204,395 B2  12/2015  Li et al.
(Continued)

FOREIGN PATENT DOCUMENTS

WO   WO2017151876 A1   9/2017
WO   WO2017196612 A1  11/2017

OTHER PUBLICATIONS

Intel Corporation: "Details for DL Beam Management", 3GPP Draft; R1-1704724 Details for DL Beam Management R2, 3rd Generation Partnership Project (3GPP), Mobile Competence Centre: 650, Route Des Lucioles; F-06921 Sophia-Antipolis Cedex; France vol. RAN WG1, No. Spokane, USA; Apr. 3, 2017-Apr. 7, 2017 Mar. 25, 2017 (Mar. 25, 2017), XP051251452, 7 Pages, Retrieved from the Internet: URL:http://www.3gpp.org/ftp/tsg_ran/WG1_RL1/TSG R1_88b/Docs/ [retrieved on Mar. 25, 2017].

(Continued)

*Primary Examiner* — Khanh C Tran
(74) *Attorney, Agent, or Firm* — Holland & Hart LLP

(57) ABSTRACT

Methods, systems, and devices for wireless communication are described that support overriding a beam monitoring pattern for control channel transmissions based on channel conditions between a user equipment and a base station. A base station may select a beam monitoring pattern for transmitting control channel transmissions, which may include a pattern in which two or more beams are used for control channel transmissions. In the event that a first beam of the beams used in the beam monitoring pattern meets certain metrics, the use of one or more additional beams according to the beam monitoring pattern may be overridden and transmissions continued using the first beam. The metrics for continuing use of the first beam may include channel quality metrics, a number of consecutive successful trans- (Continued)

missions using the first beam, one or more other metrics, or any combination thereof.

30 Claims, 16 Drawing Sheets

(58) Field of Classification Search
CPC ... H04B 17/336; H04B 7/0632; H04W 24/10; H04W 76/28; H04W 24/04; H04W 52/0245; H04L 5/0048
See application file for complete search history.

(56) References Cited

U.S. PATENT DOCUMENTS

| | | | |
|---|---|---|---|
| 9,468,022 B2 | 10/2016 | Li et al. | |
| 2013/0121185 A1* | 5/2013 | Li | H04W 72/046 370/252 |
| 2017/0111886 A1* | 4/2017 | Kim | H04W 72/042 |
| 2017/0331670 A1 | 11/2017 | Parkvall et al. | |
| 2018/0227899 A1* | 8/2018 | Yu | H04B 7/0695 |
| 2018/0310283 A1* | 10/2018 | Deenoo | H04W 72/042 |
| 2018/0359790 A1* | 12/2018 | Ingale | H04W 8/24 |
| 2019/0053072 A1* | 2/2019 | Kundargi | H04B 7/0814 |
| 2019/0090147 A1* | 3/2019 | Durvasula | H04B 7/1851 |

OTHER PUBLICATIONS

International Search Report and Written Opinion—PCT/US2018/021196—ISA/EPO—Jun. 15, 2018.
Qualcomm Incorporated: "Control Channel Multi-Beam Operation", 3GPP Draft; R14-1705583 Controlchannelbeamrobustness, 3rd Generation Partnership Project (3GPP), Mobile Competence Centre; 650, Route Des Lucioles; F-06921 Sophia-Antipolis Cedex; France vol. RAN WG1, No. Spokane, USA Mar. 25, 2017 (Mar. 25, 2017), XP051252325, 5 Pages, Retrieved from the Internet: URL:http://www.3gpp.org/ftp/tsg_ran/WG1_RL1/TSGR1_88b/Docs/ [retrieved on Mar. 25, 2017].

* cited by examiner

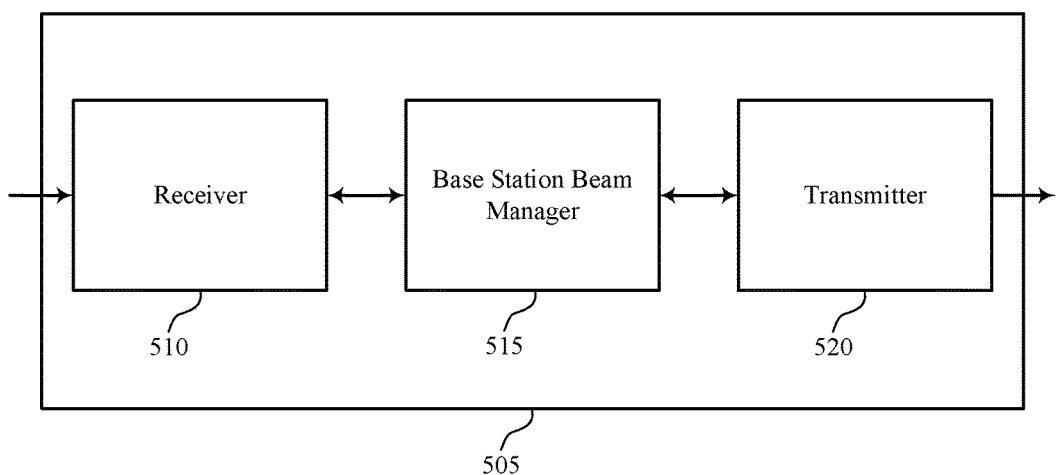
FIG. 5
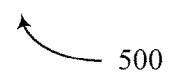

DYNAMIC OVERRIDING OF CONTROL BEAM MONITORING CONFIGURATION

CROSS REFERENCES

The present application for patent claims priority to U.S. Provisional Patent Application No. 62/480,340 by John Wilson, et al., entitled "Dynamic Overriding of Control Beam Monitoring Configuration," filed Mar. 31, 2017, assigned to the assignee hereof.

BACKGROUND

The following relates generally to wireless communication, and more specifically to dynamic overriding of control beam monitoring configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems (e.g., NR systems) may operate in frequency ranges that are associated with beamformed transmissions between wireless devices, for example, transmissions in millimeter wave (mmW) frequency ranges. These transmissions may be associated with increased signal attenuation (e.g., path loss) as compared to transmissions in non-mmW frequency ranges. As a result, signal processing techniques such as beamforming may be used to combine energy coherently and overcome path losses in these systems. In some cases, control channel transmissions may be periodically transmitted using one or more transmission beams, and in some cases control channel transmissions may be transmitted on two or more different beams according to a beam monitoring pattern. Conventional solutions for controlling a beam monitoring pattern are deficient.

SUMMARY

The described techniques relate to improved methods, systems, devices, or apparatuses that support overriding a beam monitoring pattern for control channel transmissions based on channel conditions between a user equipment (UE) and a base station. In various examples, a base station may select a beam monitoring pattern for transmitting control channel transmissions, which may include a pattern in which two or more beams are used for control channel transmissions. An example pattern may be a time division multiplexing (TDM) pattern. In the event that a first beam of the beams used in the beam monitoring pattern meets certain metrics, the use of one or more additional beams according to the beam monitoring pattern may be overridden and transmissions may be continued using the first beam. In some cases, the metrics for continuing use of the first beam may include channel quality metrics, a number of consecutive successful transmissions using the first beam, one or more other metrics, or any combination thereof.

In some cases, a base station may send an indication to the UE that the first beam is to be continued to be used for control channel transmissions. In other cases, a UE may send an indication to the base station that the first beam is to be continued to be used for control channel transmissions. In still other cases, both the UE and the base station may be configured with the same set of metrics, and may autonomously continue to use the first beam for control channel transmissions without transmissions of additional signaling. In some cases, the metrics may be evaluated, and re-evaluated, at predetermined time durations to determine if the configured beam monitoring pattern should be used or overridden.

A method of wireless communication is described. The method may include identifying a first beam monitoring pattern for transmitting control channel transmissions, the first beam monitoring pattern indicating that the control channel transmissions are to be transmitted using a first subset of transmission beams in a first subset of time periods and that the control channel transmissions are to be transmitted using a second subset of transmission beams in a second subset of time periods, transmitting the control channel transmissions during the first subset of time periods using the first subset of transmission beams, determining, during the first subset of time periods, that the transmitted first subset of transmission beams exceeds a reliability threshold, and continuing transmissions using the first subset of transmission beams for at least a portion of the second subset of time periods responsive to the determining.

An apparatus for wireless communication is described. The apparatus may include means for identifying a first beam monitoring pattern for transmitting control channel transmissions, the first beam monitoring pattern indicating that the control channel transmissions are to be transmitted using a first subset of transmission beams in a first subset of time periods and that the control channel transmissions are to be transmitted using a second subset of transmission beams in a second subset of time periods, means for transmitting the control channel transmissions during the first subset of time periods using the first subset of transmission beams, means for determining, during the first subset of time periods, that the transmitted first subset of transmission beams exceeds a reliability threshold, and means for continuing transmissions using the first subset of transmission beams for at least a portion of the second subset of time periods responsive to the determining.

Another apparatus for wireless communication is described. The apparatus may include a processor, memory in electronic communication with the processor, and instructions stored in the memory. The instructions may be operable to cause the processor to identify a first beam monitoring pattern for transmitting control channel transmissions, the first beam monitoring pattern indicating that the control channel transmissions are to be transmitted using a first subset of transmission beams in a first subset of time periods and that the control channel transmissions are to be transmitted using a second subset of transmission beams in a second subset of time periods, transmit the control channel transmissions during the first subset of time periods using the first subset of transmission beams, determine, during the first subset of time periods, that the transmitted first subset of transmission beams exceeds a reliability threshold, and continue transmissions using the first subset of transmission beams for at least a portion of the second subset of time periods responsive to the determining.

A non-transitory computer readable medium for wireless communication is described. The non-transitory computer-readable medium may include instructions operable to cause a processor to identify a first beam monitoring pattern for transmitting control channel transmissions, the first beam monitoring pattern indicating that the control channel transmissions are to be transmitted using a first subset of transmission beams in a first subset of time periods and that the control channel transmissions are to be transmitted using a second subset of transmission beams in a second subset of time periods, transmit the control channel transmissions during the first subset of time periods using the first subset of transmission beams, determine, during the first subset of time periods, that the transmitted first subset of transmission beams exceeds a reliability threshold, and continue transmissions using the first subset of transmission beams for at least a portion of the second subset of time periods responsive to the determining.

Some examples of the method, apparatus, and non-transitory computer-readable medium described above may further include processes, features, means, or instructions for transmitting an indication to a UE that indicates the first subset of transmission beams may be to be used for at least the portion of the second subset of time periods. In some examples of the method, apparatus, and non-transitory computer-readable medium described above, the indication indicates that the first subset of transmission beams may be to be used for both the first subset and the second subset of time periods for an identified time duration. In some examples of the method, apparatus, and non-transitory computer-readable medium described above, the identified time duration may be indicated with the indication or may be preconfigured. In some examples of the method, apparatus, and non-transitory computer-readable medium described above, the indication may be transmitted in a media access control (MAC) control element (CE) or in downlink control information (DCI) included with the control channel transmissions. Some examples of the method, apparatus, and non-transitory computer-readable medium described above may further include processes, features, means, or instructions for receiving an acknowledgment from the UE of the indication.

In some examples of the method, apparatus, and non-transitory computer-readable medium described above, the first beam monitoring pattern maps the first subset of transmission beams to a first number of slots in the first subset of time periods and the second subset of transmission beams to a second number of slots in the second subset of time periods. In some examples of the method, apparatus, and non-transitory computer-readable medium described above, the determining comprises determining that a predetermined number of acknowledgments may be received during the first subset of time periods, determining that a signal quality of the first subset of transmission beams exceeds a signal quality threshold, or any combination thereof. In some examples of the method, apparatus, and non-transitory computer-readable medium described above, the determining comprises receiving an indication from a UE that the transmitted first subset of transmission beams exceeds the reliability threshold and acknowledging receipt of the indication. In some examples of the method, apparatus, and non-transitory computer-readable medium described above, the indication may be received in a MAC CE or in uplink control information (UCI) received from the UE.

Some examples of the method, apparatus, and non-transitory computer-readable medium described above may further include processes, features, means, or instructions for configuring a UE to determine, during the first subset of time periods, whether the transmitted first subset of transmission beams exceeds the reliability threshold, and to continue using the first subset of transmission beams for at least the portion of the second subset of time periods based on the determination, and wherein the continuing transmissions using the first subset of transmission beams may be performed autonomously at the UE and at a base station. In some examples of the method, apparatus, and non-transitory computer-readable medium described above, the configuring comprises configuring the UE with a same set of metrics as the base station for determining to continue using the first subset of transmission beams for at least the portion of the second subset of time periods.

In some examples of the method, apparatus, and non-transitory computer-readable medium described above, the continuing transmissions using the first subset of transmission beams comprises continuing transmissions using the first subset of transmission beams for an identified time duration, and resuming the first beam monitoring pattern after an expiration of the identified time duration. In some examples of the method, apparatus, and non-transitory computer-readable medium described above, the continuing transmissions using the first subset of transmission beams further comprises determining, prior to the expiration of the identified time duration, that the transmitted first subset of transmission beams continue to exceed the reliability threshold, and continuing transmissions using the first subset of transmission beams for another of the identified time duration.

Some examples of the method, apparatus, and non-transitory computer-readable medium described above may further include processes, features, means, or instructions for determining, during the first subset of time periods, that the transmitted first subset of transmission beams does not exceed a reliability threshold, identifying a second beam monitoring pattern for transmitting control channel transmissions, the second beam monitoring pattern indicating that the control channel transmissions are to be transmitted using a third subset of transmission beams in a third subset of time periods and that the control channel transmissions are to be transmitted using a fourth subset of transmission beams in a fourth subset of time periods, and overriding the beam monitoring pattern with the second beam monitoring pattern.

A method of wireless communication is described. The method may include identifying a beam monitoring pattern for monitoring control channel transmissions on transmission beams from a base station, the beam monitoring pattern indicating that the control channel transmissions are to be transmitted using a first subset of transmission beams in a first subset of time periods and that the control channel transmissions are to be transmitted using a second subset of transmission beams in a second subset of time periods, receiving the control channel transmissions during the first subset of time periods over the first subset of transmission beams, determining, during the first subset of time periods, that the transmitted first subset of transmission beams exceeds a reliability threshold, and continuing receiving the control channel transmissions using the first subset of transmission beams for at least a portion of the second subset of time periods responsive to the determining.

An apparatus for wireless communication is described. The apparatus may include means for identifying a beam monitoring pattern for monitoring control channel transmissions on transmission beams from a base station, the beam monitoring pattern indicating that the control channel transmissions are to be transmitted using a first subset of transmission beams in a first subset of time periods and that the control channel transmissions are to be transmitted using a second subset of transmission beams in a second subset of time periods, means for receiving the control channel transmissions during the first subset of time periods over the first subset of transmission beams, means for determining, during the first subset of time periods, that the transmitted first subset of transmission beams exceeds a reliability threshold, and means for continuing receiving the control channel transmissions using the first subset of transmission beams for at least a portion of the second subset of time periods responsive to the determining.

Another apparatus for wireless communication is described. The apparatus may include a processor, memory in electronic communication with the processor, and instructions stored in the memory. The instructions may be operable to cause the processor to identify a beam monitoring pattern for monitoring control channel transmissions on transmission beams from a base station, the beam monitoring pattern indicating that the control channel transmissions are to be transmitted using a first subset of transmission beams in a first subset of time periods and that the control channel transmissions are to be transmitted using a second subset of transmission beams in a second subset of time periods, receive the control channel transmissions during the first subset of time periods over the first subset of transmission beams, determine, during the first subset of time periods, that the transmitted first subset of transmission beams exceeds a reliability threshold, and continue receiving the control channel transmissions using the first subset of transmission beams for at least a portion of the second subset of time periods responsive to the determining.

A non-transitory computer readable medium for wireless communication is described. The non-transitory computer-readable medium may include instructions operable to cause a processor to identify a beam monitoring pattern for monitoring control channel transmissions on transmission beams from a base station, the beam monitoring pattern indicating that the control channel transmissions are to be transmitted using a first subset of transmission beams in a first subset of time periods and that the control channel transmissions are to be transmitted using a second subset of transmission beams in a second subset of time periods, receive the control channel transmissions during the first subset of time periods over the first subset of transmission beams, determine, during the first subset of time periods, that the transmitted first subset of transmission beams exceeds a reliability threshold, and continue receiving the control channel transmissions using the first subset of transmission beams for at least a portion of the second subset of time periods responsive to the determining.

In some examples of the method, apparatus, and non-transitory computer-readable medium described above, the first beam monitoring pattern maps the first subset of transmission beams to a first number of slots in the first subset of time periods and the second subset of transmission beams to a second number of slots in the second subset of time periods. In some examples of the method, apparatus, and non-transitory computer-readable medium described above, the determining comprises receiving an indication from the base station that indicates the first subset of transmission beams may be to be used for at least the portion of the second subset of time periods. In some examples of the method, apparatus, and non-transitory computer-readable medium described above, the indication indicates that the first subset of transmission beams may be to be used for both the first subset and the second subset of time periods for an identified time duration.

In some examples of the method, apparatus, and non-transitory computer-readable medium described above, the identified time duration may be indicated with the indication or may be preconfigured. In some examples of the method, apparatus, and non-transitory computer-readable medium described above, the indication may be received in a MAC CE or in DCI included with the control channel transmissions. Some examples of the method, apparatus, and non-transitory computer-readable medium described above may further include processes, features, means, or instructions for transmitting an acknowledgment of the indication to the base station.

In some examples of the method, apparatus, and non-transitory computer-readable medium described above, the determining comprises determining that a predetermined number of acknowledgments may be received during the first subset of time periods, determining that a signal quality of the first subset of transmission beams exceeds a signal quality threshold, or any combination thereof. In some examples of the method, apparatus, and non-transitory computer-readable medium described above, the determining comprises transmitting an indication to the base station that the transmitted first subset of transmission beams exceeds the reliability threshold, and receiving an acknowledgment of receipt of the indication, and wherein the continuing receiving the control channel transmissions using the first subset of transmission beams may be performed responsive to receiving the acknowledgment. In some examples of the method, apparatus, and non-transitory computer-readable medium described above, the indication may be transmitted in a MAC CE or in UCI.

Some examples of the method, apparatus, and non-transitory computer-readable medium described above may further include processes, features, means, or instructions for receiving, from the base station, configuration information to determine, during the first subset of time periods, whether the transmitted first subset of transmission beams exceeds the reliability threshold, and to continue using the first subset of transmission beams for at least the portion of the second subset of time periods based on the determination, and wherein the continuing receiving the control channel transmissions using the first subset of transmission beams may be performed autonomously at the base station and at a UE.

In some examples of the method, apparatus, and non-transitory computer-readable medium described above, the continuing receiving the control channel transmissions using the first subset of transmission beams comprises continuing receiving the control channel transmissions using the first subset of transmission beams for an identified time duration, and resuming the first beam monitoring pattern after an expiration of the identified time duration. In some examples of the method, apparatus, and non-transitory computer-readable medium described above, the continuing receiving the control channel transmissions using the first subset of transmission beams further comprises determining, prior to the expiration of the identified time duration, that the transmitted first subset of transmission beams continue to exceed the reliability threshold, and continuing receiving the control channel transmissions using the first subset of transmission beams for another of the identified time duration.

Some examples of the method, apparatus, and non-transitory computer-readable medium described above may further include processes, features, means, or instructions for determining, during the first subset of time periods, that the transmitted first subset of transmission beams does not exceed a reliability threshold, identifying a second beam monitoring pattern for receiving control channel transmissions, the second beam monitoring pattern indicating that the control channel transmissions are to be transmitted using a third subset of transmission beams in a third subset of time periods and that the control channel transmissions are to be transmitted using a fourth subset of transmission beams in a fourth subset of time periods, and overriding the beam monitoring pattern with the second beam monitoring pattern.

BRIEF DESCRIPTION OF THE DRAWINGS

FIGS. 5 through 7 show block diagrams of a device that supports dynamic overriding of control beam monitoring configuration in accordance with aspects of the present disclosure.

DETAILED DESCRIPTION

Figure 1:
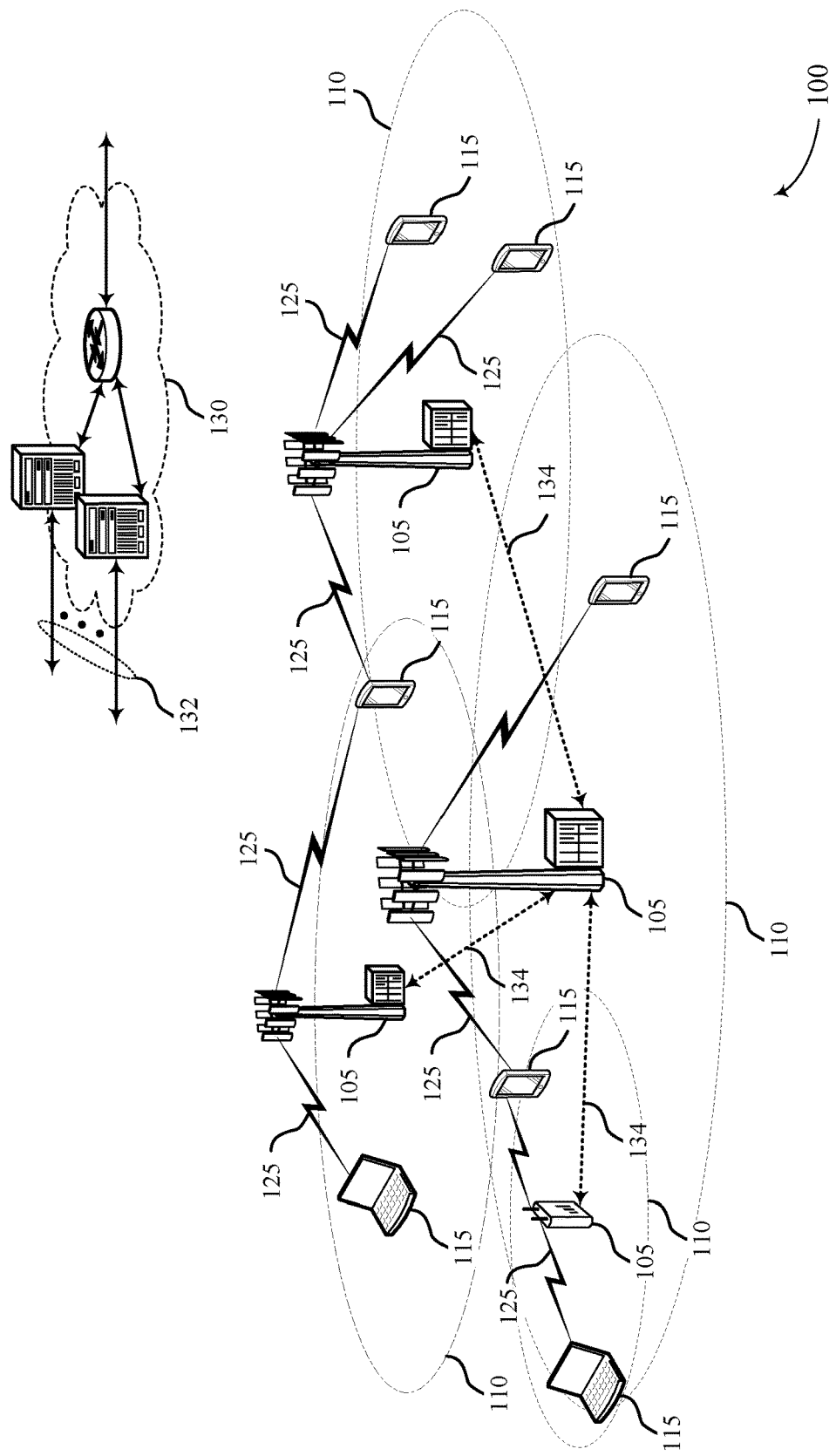
FIG. 1 illustrates an example of a system for wireless communication that supports dynamic overriding of control beam monitoring configuration in accordance with aspects of the present disclosure.

The described techniques relate to improved methods, systems, devices, or apparatuses that support overriding a beam monitoring pattern for control channel transmissions based on channel conditions between a user equipment (UE) and a base station. In various examples, a base station may select a beam monitoring pattern for transmitting control channel transmissions, which may include a pattern in which two or more beams are used for control channel transmissions. An example pattern may be a time division multiplexing (TDM) pattern. In the event that a first beam of the beams used in the beam monitoring pattern meets certain metrics, the use of one or more additional beams according to the beam monitoring pattern may be overridden and transmissions may be continued using the first beam. In some cases, the metrics for continuing use of the first beam may include channel quality metrics, a number of consecutive successful transmissions using the first beam, one or more other metrics, or any combination thereof.

Some wireless communication systems may operate in frequency ranges that support beamformed transmissions between wireless devices. Communications in mmW frequency bands may experience increased signal attenuation (e.g., path loss). As a result, signal processing techniques such as beamforming may be used to combine energy coherently and overcome the path losses in these systems. In such systems, wireless devices, such as a UE and base station, may be able to communicate over one or more active beams, which may correspond to a transmit beam used at the transmitting device and a receive beam at a receiving device (e.g., a beam pair). In some cases, control channel transmission may be transmitted periodically using one or more transmission beams, and in some cases control channel transmissions may be transmitted on two or more different beams according to a beam monitoring pattern. Such beam monitoring patterns may use combinations of two or more transmission beams to transmit control channel information, in order to provide that control channel transmissions may be received at a UE on one of the beams in the event that another of the beams is obstructed or otherwise not successfully received.

In some cases, a beam monitoring pattern may be configured for control channel (e.g., physical downlink control channel (PDCCH)) transmissions between a base station and a UE, and disclosed techniques may support overriding the beam monitoring pattern based on channel conditions. In some examples, a first beam monitoring pattern may be configured for transmitting control channel transmissions, in which two or more beams are used for control channel transmissions (e.g., according to a TDM pattern). In the event that a first beam of the beams used in the beam monitoring pattern meets certain metrics, the use of one or more additional beams according to the beam monitoring pattern may be overridden and transmissions continued using the first beam. In some cases, the metrics for continuing use of the first beam may include channel quality metrics, a number of consecutive successful transmissions using the first beam, one or more other metrics, or any combination thereof.

In some cases, a base station may send an indication to the UE that the first beam is to be continued to be used for control channel transmissions. In other cases, a UE may send an indication to the base station that the first beam is to be continued to be used for control channel transmissions. In still other cases, both the UE and the base station may be configured with the same set of metrics, and may autonomously continue to use the first beam for control channel transmissions without transmissions of additional signaling. In some cases, the metrics may be evaluated, and re-evaluated, at predetermined time durations to determine if the configured beam monitoring pattern should be used, or be overridden.

Aspects of the disclosure are initially described in the context of a wireless communications system. Aspects of the disclosure are further illustrated by and described with reference to apparatus diagrams, system diagrams, and flowcharts that relate to dynamic overriding of control beam monitoring configuration.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE, LTE-Advanced (LTE-A) network, or an NR network. In some cases, the wireless communications system 100 may support enhanced broadband communications, ultra-reliable (i.e., mission critical) communications, low latency communications, and communications with low-cost and low-complexity devices. The wireless communications system 100 may support dynamic overriding of control beam monitoring configurations based on, for example, a reliability of a primary beam used for control channel transmissions.

The base stations 105 may wirelessly communicate with the UEs 115 via one or more base station antennas. Each base station 105 may provide communication coverage for a respective geographic coverage area 110. Communication links 125 shown in the wireless communications system 100 may include uplink transmissions from a UE 115 to a base station 105, or downlink transmissions, from a base station 105 to a UE 115. Control information and data may be multiplexed on an uplink or downlink channel according to various techniques. For example, control information and data may be multiplexed on a downlink channel using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

The UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The core network 130 may provide user authentication, access authorization, tracking, Internet Protocol (IP) connectivity, and other access, routing, or mobility functions. At least some of the network devices, such as a base station 105 may include subcomponents such as an access network entity, which may be an example of an access node controller (ANC). Each access network entity may communicate with a number of the UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The wireless communications system 100 may operate in an ultra-high frequency (UHF) frequency region using frequency bands from 700 MHz to 2600 MHz (2.6 gigahertz (GHz)), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to the UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, the wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

The wireless communications system 100 may thus support mmW communications between the UEs 115 and the base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that signals transmitted at particular angles experience constructive interference while signals transmitted at different angles experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of the wireless communications system 100 may use beamforming. For example, the base station 105 may have an antenna array with a number of rows and columns of antenna ports that the base station 105 may use for beamforming in its communication with a UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or a UE 115 may be located within one or more antenna arrays (e.g., panels), which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, the wireless communications system 100 may be a packet-based network that operate according to a layered protocol stack. In the user plane, communications at the bearer or Packet Data Convergence Protocol (PDCP)

layer may be IP-based. A radio link control (RLC) layer may in some cases perform packet segmentation and reassembly to communicate over logical channels. A MAC layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a network device, or the core network 130 supporting radio bearers for user plane data. At the physical (PHY) layer, transport channels may be mapped to physical channels.

Thus, in the wireless communications system 100, the UEs 115 and the base stations 105 communicate over one or more active beams. In some cases, control channel transmissions may be periodically transmitted according to a beam monitoring pattern. For example, a radio subframe may include two slots, and a PDCCH transmission may be transmitted to a UE 115 once per slot. The PDCCH transmission may be transmitted, for example, using a first transmission beam for a predetermined number of slots, and then transmitted using a different second transmission beam for a second predetermined number of slots. In some cases, the control channel transmission using the second transmission beam may be transmitted at a higher power and/or aggregation level due to the second transmission beam being a weaker beam at the UE 115 than the first transmission beam. The use of different transmission beams in such a monitoring pattern may provide for the control channel transmissions to be able to be received at the UE 115 on either the first transmission beam or the second transmission beam in the event that one of the beams is obstructed or otherwise not successfully received. Various disclosed techniques may support overriding the beam monitoring pattern based on channel conditions.

Figure 2:
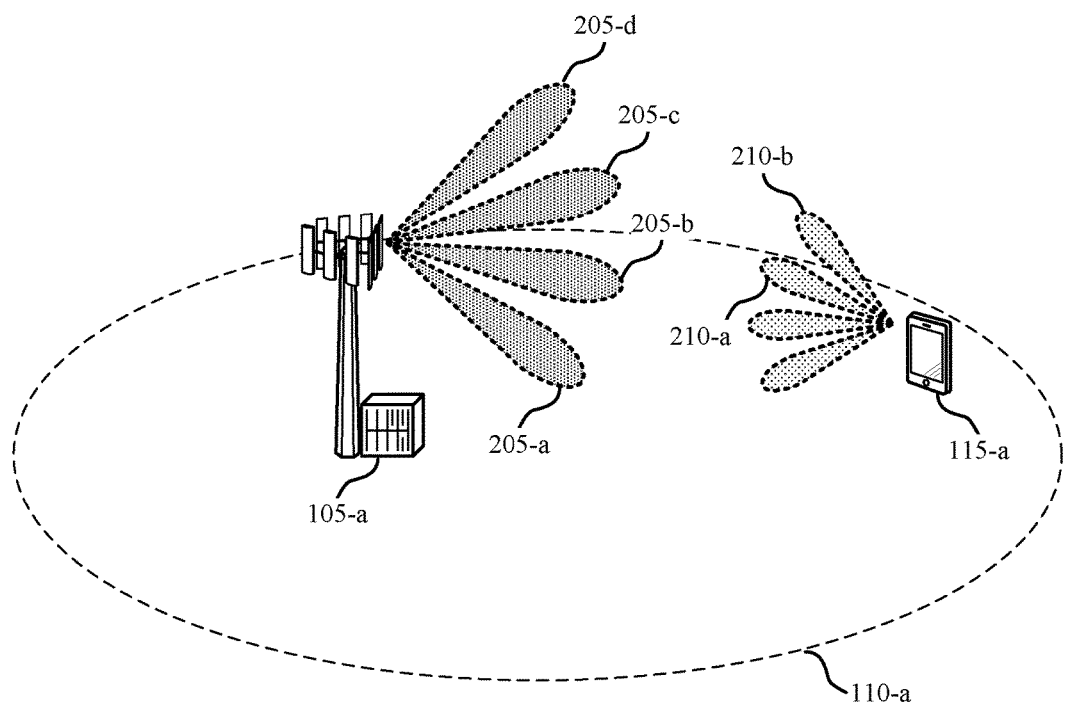
FIG. 2 illustrates an example of a wireless communication system that supports dynamic overriding of control beam monitoring configuration in accordance with aspects of the present disclosure.

FIG. 2 illustrates an example of a wireless communications system 200 that supports dynamic overriding of control beam monitoring configuration in accordance with various aspects of the present disclosure. The wireless communications system 200 includes a base station 105-a and a UE 115-a, each of which may be an example of the corresponding devices as described with reference to FIG. 1.

The wireless communications system 200 may operate in frequency ranges that are associated with beamformed transmissions between the base station 105-a and the UE 115-a. For example, the wireless communications system 200 may operate using mmW frequency ranges. As a result, signal processing techniques, such as beamforming, may be used to combine energy coherently and overcome path losses. By way of example, the base station 105-a may contain multiple antennas. In some cases, each antenna may transmit (or receive) a phase-shifted version of a signal such that the phase-shifted versions constructively interfere in certain regions and destructively interfere in others. Weights may be applied to the various phase-shifted versions in order to, for example, steer the transmissions in a desired direction. Such techniques (or similar techniques) may serve to increase the coverage area 110-a of the base station 105-a or otherwise benefit the wireless communications system 200.

Downlink beams 205-a, 205-b, 205-c, and 205-d represent examples of beams over which data (e.g., control information, shared channel data, or combinations thereof) may be transmitted. Accordingly, each downlink beam 205 may be directed from the base station 105-a toward a different region of the coverage area 110-a and in some cases, two or more beams may overlap. The downlink beams 205-a and 205-b may be transmitted simultaneously or at different times. In either case, a UE 115-a may be capable of receiving the information in one or more of the downlink beams 205. Similarly, the UE 115-a may transmit two or more uplink beams 210 (e.g., uplink beams 210-a, 210-b).

As indicated above, in some cases, control channel transmissions (e.g., PDCCH transmissions) might use more than one beam for robustness to channel blocking. In such cases, the base station 105-a may transmit control channel transmissions, and the UE 115-a may be configured to monitor for control channel transmissions according to a beam monitoring pattern across slots. For example, a beam monitoring pattern may include TDM monitoring of PDCCH beams across slots, in which certain slots may use a first subset of transmission beams (e.g., a single first transmission beam or combination of two or more beams) and other slots may use a second subset of transmission beams (e.g., a single second transmission beam or a combination of two or more beams). A beam pattern may be a function that maps one or more beams to a transmission time interval (e.g., slot, minislot, control resource set (CORESET), subframe, frame, or the like). The CORESET may include, for example, one or more resource blocks in the frequency domain and one or more OFDM symbol periods in the time domain. An example beam pattern may include transmitting a first beam for a first transmission time interval (e.g., a first number of slots (e.g., 9 slots)) and then transmitting a second beam for a second transmission time interval (e.g., a second number of slots (e.g., 10 slots). The beam pattern may include a different or the same number of slots for the first and second beams, and any number of slots may be used. The beam pattern may repeated. A first beam pattern may be a default function and a second beam pattern may be an overriding function.

In some cases, the first subset of transmission beams may use a transmission beam that has a better channel quality than that of the second subset of transmission beams. In such cases, whenever the weaker second subset of transmission beams are used, the control channel transmission may be sent at a higher aggregation level, or at a higher power, to close the link and provide a higher likelihood of successful reception at the UE 115-a. The benefit of using a weaker link comes into play when there is degradation on the stronger link, where the UE 115-a may start to fail to receive control channel transmissions on the stronger link but successfully receive a transmission over the weaker link.

The present disclosure provides techniques to enhance network efficiency when the strong link has been observed to be a reliable link. For example, if the first subset of transmission beams have resulted in successful reception of transmissions for a certain number of consecutive slots, it is unlikely that the link has degraded significantly in one or more subsequent slots. In such cases, transmissions using higher power and/or aggregation levels on the second subset of beams may be less efficient than simply continuing transmissions using the first subset of transmission beams. In various aspects of the present disclosure, techniques are provided that may more efficiently utilize the base station 105-a resources while also providing robustness in control channel transmissions.

In some cases, the base station 105-a may dynamically indicate to the UE 115-a (e.g., via MAC CE or DCI transmissions) that an overriding monitoring pattern is to be used. In some examples, the overriding monitoring pattern may be used for a certain time duration, such as for the next N slots (e.g., where N is 40), before switching back to the first monitoring pattern. In some cases, prior to the expiration of the time duration, the first subset of beams may be re-evaluated and the overriding pattern may be continued for another of the time durations. In some cases, the second monitoring pattern may simply be to continue control channel transmissions using a first transmission beam that has been identified as exceeding a reliability threshold. In some cases, after indicating to the UE 115-*a* to override the first monitoring pattern, the UE 115-*a* may acknowledge receipt of the indication and both the UE 115-*a* and the base station 105-*a* may use the second monitoring pattern.

In other cases, the UE 115-*a* may dynamically indicate to the base station 105-*a* that the second monitoring pattern is to be used when the UE 115-*a* observes the first subset of transmission beams have exceeded the reliability threshold. In some cases, similarly as indicated above, the reliability threshold may be a number of consecutive control channel transmissions that are successfully received at the UE 115-*a*, reference signal (RS) or synchronization signal (SS) (e.g., PDCCH RS/CSI-RS/SS) signal to noise ratios (or signal to noise plus interference ratios) that exceed a threshold value, or combinations thereof. In still further cases, both the base station 105-*a* and the UE 115-*a* may implicitly determine when to use the overriding monitoring pattern, and may both switch to an overriding pattern (e.g., at a time $N_1$ for N slots), before switching back to the pre-configured pattern (or re-evaluating whether to continue the overriding pattern).

In some examples, the reliability threshold may be defined in such a way that the control channel should not fail in most instances when the reliability threshold is met (e.g., the reliability threshold is not exceeded). For example, the communications are robust when a main control link does not fail. In some cases, having two beams configured in every slot for exchanging control information may be very robust considering that if one beam fails, the other beam may be able to convey the control information. However, using two beams at all times may waste resources. The monitoring patterns described herein may be used to increase the robustness of the transmissions while using less resources than the example using two beams.

Figure 3:
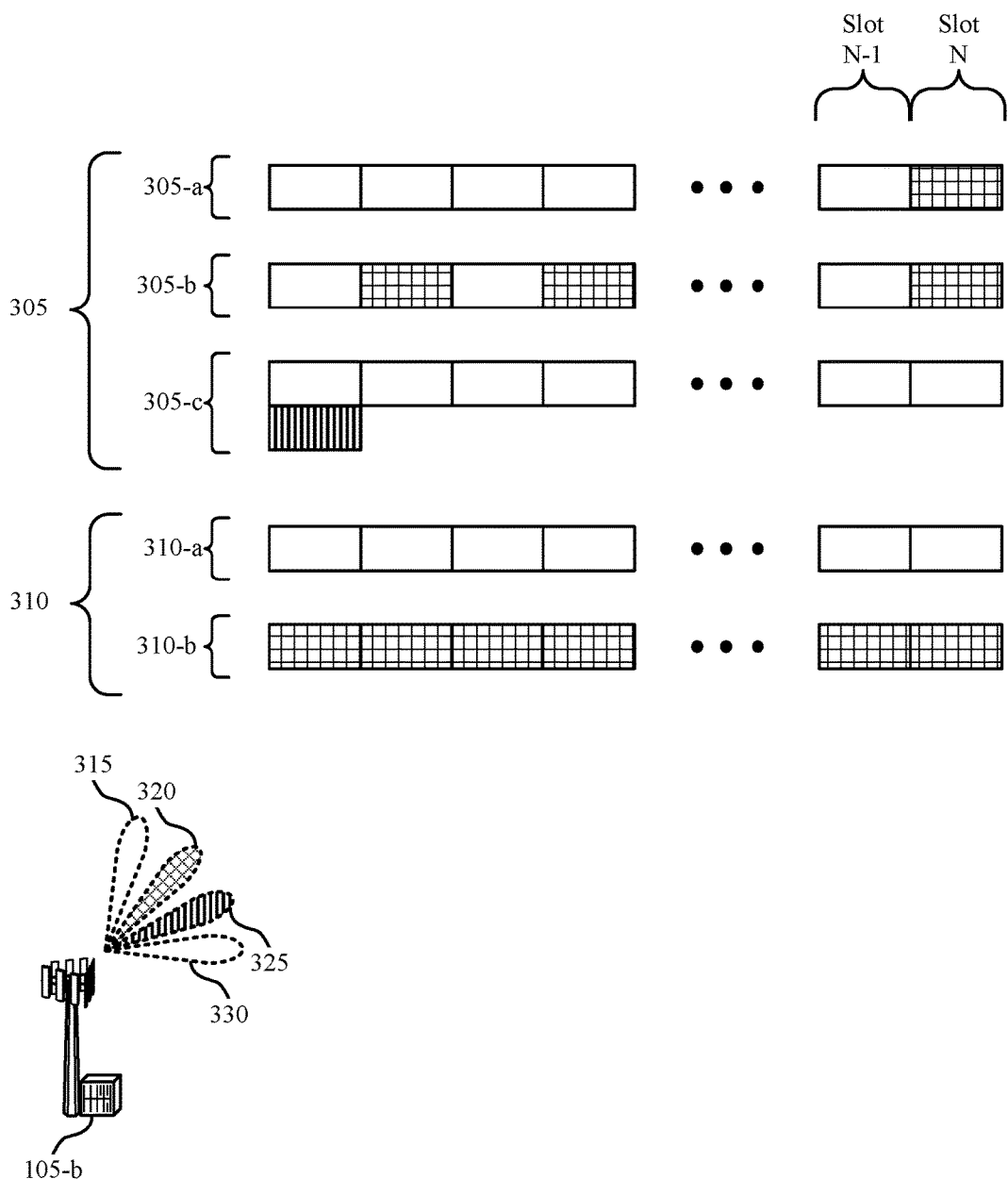
FIG. 3 illustrates an example of beam monitoring patterns that support dynamic overriding of control beam monitoring configuration in accordance with aspects of the present disclosure.

As discussed above, different monitoring patterns may be used for monitoring transmission beams for control channel transmissions. FIG. 3 illustrates an example of beam monitoring patterns 300 that support dynamic overriding of control beam monitoring configurations in accordance with various aspects of the present disclosure. In some examples, the beam monitoring patterns 300 may be used to implement aspects of the wireless communication system 100. The beam monitoring patterns 300 may, for example, be used by a UE 115 and a base station 105 as described with reference to FIGS. 1 and 2. Aspects of the beam monitoring patterns 300 have been simplified for the sake of explanation. Accordingly, the arrangement and periodicity of the various resources described below may vary from what is depicted in FIG. 3.

The beam monitoring patterns 300 may provide, for example, PDCCH monitoring patterns that are defined as a mapping from symbols or slots to a subset of PDCCH beams. In some examples, a base station 105-*b* may transmit control channel transmissions on one or more transmission beams, including a first transmission beam 315, a second transmission beam 320, and a third transmission beam 325. Additionally, there may be two types of PDCCH beam monitoring patterns, including a set of configured patterns 305 and a set of overriding patterns 310. The set of overriding patterns 310 may be treated as fall back patterns when measurements indicate the set of overriding patterns 310 would improve functionality, such as reliability. In some examples, using the set of overriding patterns 310 may be performed in a fall back mode of operation.

In the depicted example, the configured patterns 305 may include a number of different patterns that may be selected by the base station 105-*b*. For example, a first beam monitoring pattern 305-*a* may provide that control channel transmissions are transmitted using the first transmission beam 315 for a first N-1 slots, followed by a control channel transmission transmitted using the second transmission beam 320 in slot N, and the pattern may repeat for a subsequent N slots. In an example, the first beam monitoring pattern 305-*a* may map a first subset of transmission beams 315, 320, 325, and 330 (e.g., beam 315) to a first number of slots (e.g., the first N-1 slots) in a first subset of time periods (e.g., N-1 of the N total slots) and a second subset of transmission beams 315, 320, 325, and 330 (e.g., beam 320) to a second number of slots (e.g., slot N) in a second subset of time periods (e.g., Nth slot). The time periods may correspond to the N time periods allocated to the N slots.

A second beam monitoring pattern 305-*b* may provide that control channel transmissions are transmitted using the first transmission beam 315 in even-numbered slots, and control channel transmissions are transmitted using the second transmission beam 320 in odd-numbered slots. In an example, the second beam monitoring pattern 305-*b* may map a first subset of transmission beams 315, 320, 325, and 330 (e.g., beam 315) to a first number of slots in a first subset of time periods (e.g., the even-numbered slots of the N slots) and the second subset of transmission beams 315, 320, 325, and 330 (e.g., beam 320) to a second number of slots in a second subset of time periods (e.g., the odd-numbered slots of the N slots). In some cases, beam monitoring patterns may provide that control channel transmissions are transmitted using more than one beam in a slot, such as in a third beam monitoring pattern 305-*c* in which control channel transmissions are transmitted using the first transmission beam 315 and the third transmission beam 325 in a first slot, followed by transmissions using the first transmission beam 315 until the pattern repeats. Numerous other different beam monitoring patterns may be configured, and the examples in FIG. 3 are provided for purposes of discussion and illustration only and are not limiting to the disclosure.

In the event that a beam or subset of beams are determined to meet reliability thresholds, an overriding pattern 310 may be selected for control channel transmissions for a certain time duration, in some examples. In the example of FIG. 3, a first overriding pattern 310-*a* may include control channel transmissions using only the first beam 315. Similarly, a second overriding pattern 310-*b* may include control channel transmissions using only the second beam 320. In some implementations, there may not be an explicit set of configured overriding patterns, but simply an override rule to stay on a first beam or a subset of beams for a time duration (e.g., the next N slots) when the first beam or subset of beams meets the reliability threshold. In cases where an overriding pattern is used, the set of overriding patterns 310 may include numerous different overriding patterns, with the examples of FIG. 3 provided for purposes of illustration and discussion only. In some cases, the base station 105-*b* may configure one or more UEs with the set of configured patterns 305 and the set of overriding patterns 310, and may signal to the UE 115-*a* which pattern of the different sets of patterns are to be used for control channel monitoring. In some cases, the sets of patterns and/or particular patterns to be used for control channel transmissions to a UE 115-*a* may be semi-statically configured and signaled to the UE 115-*a* via, for example, RRC signaling.

For example, a base station 105-*b* may use a first beam monitoring pattern 305-*a* to transmit a first subset of transmission beams 315, 320, 325, and 330 (e.g., beam 315). The base station 105-*b* may determine that, in a first subset of time periods (e.g., first N−1 slots), the transmitted first subset of transmission beams (e.g., beam 315) does not exceed the reliability threshold. The base station 105-*b* may identify a second beam monitoring pattern 310 for transmitting control channel transmissions. The second beam monitoring pattern 310 may indicate that the control channel transmissions are to be transmitted using a third subset of transmission beams 315, 320, 325, and 330 (e.g., beam 325) in a third subset of time periods (e.g., the first N−1 slots of a second set of N slots that begins after the Nth slot of the first set of N slots) and that the control channel transmissions are to be transmitted using a fourth subset of transmission beams 315, 320, 325, and 330 (e.g., beam 330) in a fourth subset of time periods (e.g., the Nth slot in the second set of N slots). The base station 105-*b* may determine to override the first beam monitoring pattern 305-*a* and instead utilize the second beam monitoring pattern 310, for example, based on determining that the transmitted first subset of transmission beams (e.g., beam 315) does not exceed the reliability threshold. In some cases, the UE 115-*a* may make a similar determination that the transmitted first subset of transmission beams (e.g., beam 315) does not exceed the reliability threshold and instruct the base station 105-*b* override the first beam monitoring pattern 305-*a* and instead utilize the second beam monitoring pattern 310 for transmissions.

In some cases, the determination to switch from a configured monitoring pattern 305 to an overriding monitoring pattern 310 may be made at the base station 105-*b* and dynamically signaled to the UE 115-*a* (e.g., via a MAC CE or in DCI). As discussed above, in some cases an overriding beam pattern may be configured, or there may be a rule to stay on a current beam or subset of beams for a time duration (e.g., for the next N slots) when the current beam or subset of beams meets the reliability threshold. For example, the base station 105-*b* may configure the first monitoring pattern 305-*a* where N is 40, and may begin control channel transmissions according to the configured pattern. During the transmissions, the base station 105-*b* may observe that the control channel transmissions on the first transmission beam 315 are successfully received at the UE 115-*a* (e.g., ACK is received from the UE 115-*a*) for 35 consecutive slots. Additionally or alternatively, the base station 105-*b* may identify that measurements associated with the first transmission beam 315 (e.g., a certain number of channel quality information (CQI) reports from the UE 115-*a*) show the channel quality of the first beam above a threshold value for a certain time period.

When the reliability of the first transmission beam 315 meets or exceeds such a reliability threshold, the base station 105-*b* may indicate to the UE 115-*a* that the first overriding pattern 310-*a* (which may be to simply continue with a current transmission beam) is to be used for the next N slots. The UE, responsive to the received indication from the base station 105-*a*, may switch to the first overriding pattern 310-*a* and continue monitoring the first transmission beam 315 until slot 75, and then may switch back to the first beam monitoring pattern 305-*a* at slot 76. The base station 105-*b*, at slot 76, may then decide that the first overriding pattern 310-*a* is to be used again, if the over-ride action continues; otherwise both the base station 105-*b* and the UE 115-*a* fall back to the first monitoring pattern 305-*a*. In another example, the first overriding pattern 310-*a* is considered a fall back pattern and both the base station 105-*b* and the UE 115-*a* fall back to the first overriding pattern 310-*a* when operating in a fall back mode. In some examples, the UE 115-*a* may indicate to the base station 105-*b* to move to the first overriding pattern 310-*a*, and the base station 105-*b* may make a final decision based on UE feedback.

In some cases, the UE 115-*a* may observe that control channel transmissions using the first transmission beam 315 meet the reliability threshold for the defined number of slots (e.g., based on a number of successful receptions, channel measurements, or combinations thereof), and may indicate to the base station 105-*b* to use the first overriding pattern 310-*a* for the next N slots. In such cases, the base station 105-*b* may acknowledge the switch, and apply the overriding monitoring pattern for the next N slots, before switching back, with re-evaluation prior to the expiration of the override time duration.

In some cases, both the base station 105-*b* and a UE 115-*a* may autonomously switch from a configured monitoring pattern. In such cases, the UE 115-*a* may observe that transmissions using the first transmission beam 315 meet a reliability threshold for a set number of time slots, and the base station 105-*b* may make a similar determination based on a same set of metrics. Such metrics may be predefined threshold metrics that may be specified or configured by the base station 105-*b*. As the reliability threshold metric(s) have been met both at the base station 105-*b* and the UE 115-*a* (e.g., at slot 36), both the base station 105-*b* and the UE 115-*a* may override their monitoring patterns with an overriding pattern (e.g., the first overriding pattern 310-*a*) for the next N slots, and a re-evaluation may be performed again after the set number of time slots. Such a scheme thus has reduced signaling overhead and gives robustness for control channel transmissions while also allowing more efficient use of resources when a transmission beam used for control channel transmissions has good reliability.

Figure 4:
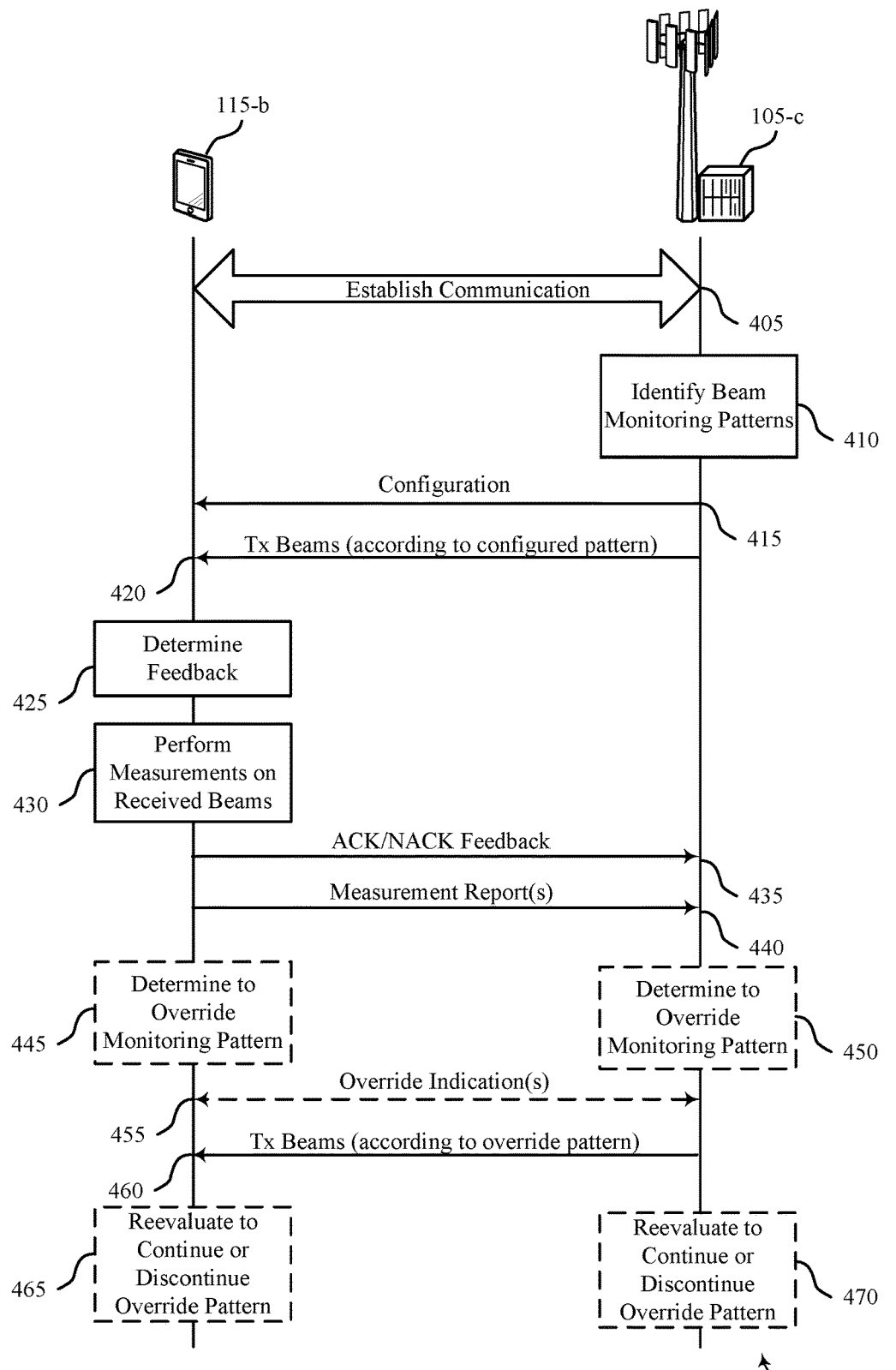
FIG. 4 illustrates an example of a process flow that supports dynamic overriding of control beam monitoring configuration in accordance with aspects of the present disclosure.

FIG. 4 illustrates an example of a process flow 400 that supports dynamic overriding of control beam monitoring configuration in accordance with various aspects of the present disclosure. The process flow 400 includes a UE 115-*b* and a base station 105-*c*, each of which may be an example of the corresponding devices described above with reference to FIGS. 1 through 3.

At 405, the UE 115-*b* and the base station 105-*c* may establish communications using one or more active beams. At 410, the base station 105-*c* may identify beam monitoring patterns to be used for monitoring control channel transmissions (e.g., via MAC CE or DCI transmissions). In some cases, the monitoring patterns may include one or more configured monitoring patterns and one or more overriding patterns. In some cases, a configured monitoring pattern and an overriding pattern may be selected from a set of available patterns and configured for control channel transmissions. The base station 105-*c* may transmit configuration information 415 to the UE 115-*b*. The base station 105-*c* may transmit transmission beams with control channel transmissions 420 according to the configured pattern.

The UE 115-*b*, at block 425, may determine feedback (e.g., ACK/NACK feedback) for control channel transmissions 420 transmitted on the transmission beams. Such feedback may indicate, for example, that the control channel transmission was successfully received at the UE 115-*b*. In some cases, the UE 115-*b* may perform measurements on received beams, as indicated at block 430. Such measurements may include, for example, CQI measurements that may be periodically performed (e.g., every 5 ms). The UE 115-*b* may transmit the ACK/NACK feedback 435 and one or more measurement reports 440 to the base station 105-*c*.

At block 445, the UE 115-*b* may determine whether to override the configured monitoring pattern. Such a determination may be made according to the techniques as discussed above, and may be based on a reliability of transmissions on a first subset of transmission beams, for example. Likewise, at block 450, the base station 105-*c* may determine whether to override the configured monitoring pattern. Such a determination may likewise be based on a reliability of transmissions on a first subset of transmission beams, for example. As discussed above, in some examples, such a determination may be an implicit determination made at one or both of the UE 115-*b* or the base station 105-*c* and separate signaling may not be necessary.

In examples where an indication of overriding is provided, the base station 105-*c* or the UE 115-*b*, or both, may transmit the override indication 455, and in some cases may receive an acknowledgment of the override. In some cases, the override indications 455 may not be transmitted, and both the UE 115-*b* and the base station 105-*c* may autonomously switch to the overriding pattern or continue with a current transmission beam or subset of transmission beams. The base station 105-*c* may transmit transmission beams 460 with control channel transmissions according to the overriding pattern, which may be to continue transmitting using a transmission beam that was determined to meet a reliability threshold. At block 465 and block 470, the UE 115-*b* and the base station 105-*c* may reevaluate channel reliability and determine whether to continue or discontinue overriding, in some cases.

In some cases, following a set time duration (e.g., a set number of slots), the base station 105-*c* and the UE 115-*b* may fall back to the configured monitoring pattern. In some cases, the base station 105-*c* and the UE 115-*b* may fall back to the configured monitoring pattern in the event that any transmissions using the overriding pattern are not successfully received.

FIG. 5 shows a block diagram 500 of a wireless device 505 that supports dynamic overriding of control beam monitoring configuration in accordance with aspects of the present disclosure. The wireless device 505 may be an example of aspects of a base station 105 as described herein. The wireless device 505 may include a receiver 510, a base station beam manager 515, and a transmitter 520. The wireless device 505 may also include a processor. Each of these components may be in communication with one another (e.g., via one or more buses).

The receiver 510 may receive information such as packets, user data, or control information associated with various information channels (e.g., control channels, data channels, and information related to dynamic overriding of control beam monitoring configuration, etc.). Information may be passed on to other components of the wireless device 505. The receiver 510 may be an example of aspects of the transceiver 835 described with reference to FIG. 8. The receiver 510 may utilize a single antenna or a set of antennas.

The base station beam manager 515 may be an example of aspects of the base station beam manager 815 described with reference to FIG. 8.

The base station beam manager 515 and/or at least some of its various sub-components may be implemented in hardware, software executed by a processor, firmware, or any combination thereof. If implemented in software executed by a processor, the functions of the base station beam manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The base station beam manager 515 and/or at least some of its various sub-components may be physically located at various positions, including being distributed such that portions of functions are implemented at different physical locations by one or more physical devices. In some examples, the base station beam manager 515 and/or at least some of its various sub-components may be a separate and distinct component in accordance with various aspects of the present disclosure. In other examples, the base station beam manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The base station beam manager 515 may identify a first beam monitoring pattern for transmitting control channel transmissions, the first beam monitoring pattern indicating that the control channel transmissions are to be transmitted using a first subset of transmission beams in a first subset of time periods and that the control channel transmissions are to be transmitted using a second subset of transmission beams in a second subset of time periods. The base station beam manager 515 may also cause the control channel transmissions to be transmitted during the first subset of time periods using the first subset of transmission beams, and determine, during the first subset of time periods, that the transmitted first subset of transmission beams exceeds a reliability threshold. The base station beam manager 515 may cause the transmissions to be continued using the first subset of transmission beams for at least a portion of the second subset of time periods responsive to determining that the transmitted first subset of transmission beams exceeds a reliability threshold.

The transmitter 520 may transmit signals generated by other components of the wireless device 505. In some examples, the transmitter 520 may be collocated with the receiver 510 in a transceiver module. For example, the transmitter 520 may be an example of aspects of the transceiver 835 described with reference to FIG. 8. The transmitter 520 may utilize a single antenna or a set of antennas.

Figure 6:
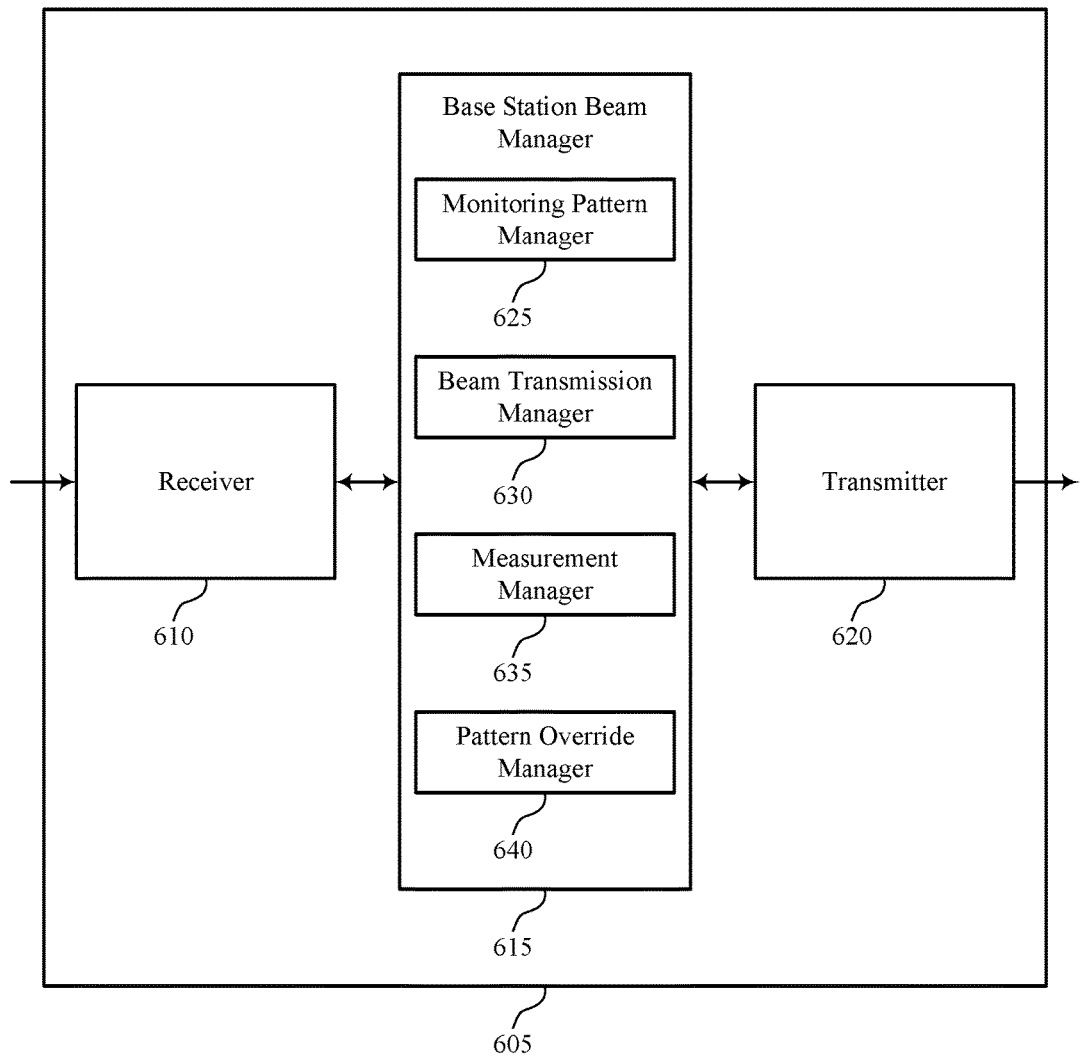

FIG. 6 shows a block diagram 600 of a wireless device 605 that supports dynamic overriding of control beam monitoring configuration in accordance with aspects of the present disclosure. The wireless device 605 may be an example of aspects of a wireless device 505 or a base station 105 as described with reference to FIG. 5. The wireless device 605 may include a receiver 610, a base station beam manager 615, and a transmitter 620. The wireless device 605 may also include a processor. Each of these components may be in communication with one another (e.g., via one or more buses).

The receiver 610 may receive information such as packets, user data, or control information associated with various information channels (e.g., control channels, data channels, and information related to dynamic overriding of control beam monitoring configuration, etc.). Information may be passed on to other components of the wireless device 605. The receiver 610 may be an example of aspects of the transceiver 835 described with reference to FIG. 8. The receiver 610 may utilize a single antenna or a set of antennas.

The base station beam manager 615 may be an example of aspects of the base station beam manager 815 described with reference to FIG. 8. The base station beam manager 615 may also include a monitoring pattern manager 625, a beam transmission manager 630, a measurement manager 635, and a pattern override manager 640.

The monitoring pattern manager 625 may identify a first beam monitoring pattern for transmitting control channel transmissions, the first beam monitoring pattern indicating that the control channel transmissions are to be transmitted using a first subset of transmission beams in a first subset of time periods and that the control channel transmissions are to be transmitted using a second subset of transmission beams in a second subset of time periods. In some cases, the first beam monitoring pattern is selected from a set of available beam monitoring patterns based on channel conditions between the UE and the base station, and a second beam monitoring pattern is selected from a set of override beam monitoring patterns. In some cases, the second beam monitoring pattern is used when continuing transmissions using the first subset of transmission beams for at least the portion of the second subset of time periods. In some cases, the first subset of transmission beams includes a first transmission beam and the second subset of transmission beams includes a second transmission beam, and where the second transmission beam is a weaker transmission beam than the first transmission beam. In some cases, the control channel transmissions transmitted using the second transmission beam are transmitted at a higher power, a higher aggregation level, or any combination thereof, relative to the control channel transmissions using the first transmission beam. In some cases, the first beam monitoring pattern maps the first subset of transmission beams to a first number of slots in the first subset of time periods and the second subset of transmission beams to a second number of slots in the second subset of time periods.

The beam transmission manager 630 may transmit the control channel transmissions during the first subset of time periods using the first subset of transmission beams. The measurement manager 635 may determine, during the first subset of time periods, that the transmitted first subset of transmission beams exceeds a reliability threshold. In some cases, such a determination may include determining that a predetermined number of acknowledgments are received during the first subset of time periods, a signal quality of the first subset of transmission beams exceeds a signal quality threshold, or any combination thereof, and where an indication of the determination is transmitted to the UE.

The pattern override manager 640 may indicate that a configured beam monitoring pattern is to be overridden. In some cases, an indication that a first subset of transmission beams is to be continued may be signaled to a UE, and an acknowledgment may be received from the UE regarding the indication. In such cases, transmissions using the first subset of transmission beams may be continued for at least a portion of the second subset of time periods. In some cases, the determining includes receiving an indication from a UE that the transmitted first subset of transmission beams exceeds the reliability threshold and acknowledging receipt of the indication. In some cases, the indication is received in a MAC CE or in UCI received from the UE. In some cases, the monitoring pattern may be overridden autonomously at the UE and at the base station. In some cases, the continuing transmissions using the first subset of transmission beams includes continuing transmissions using the first subset of transmission beams for an identified time duration, and resuming the first beam monitoring pattern after an expiration of the identified time duration. In some cases, the continuing transmissions using the first subset of transmission beams further includes determining, prior to the expiration of the identified time duration, that the transmitted first subset of transmission beams continue to exceed the reliability threshold, and continuing transmissions using the first subset of transmission beams for another of the identified time duration.

The transmitter 620 may transmit signals generated by other components of the wireless device 605. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
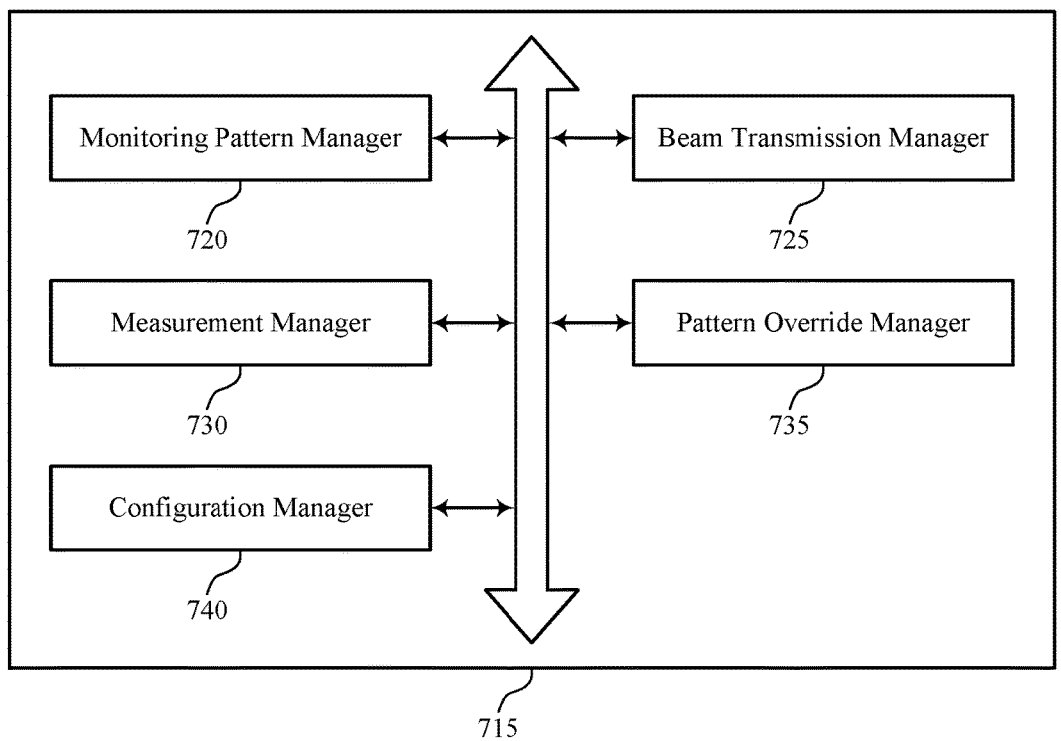

FIG. 7 shows a block diagram 700 of a base station beam manager 715 that supports dynamic overriding of control beam monitoring configuration in accordance with aspects of the present disclosure. The base station beam manager 715 may be an example of aspects of a base station beam manager 515, a base station beam manager 615, or a base station beam manager 815 described with reference to FIGS. 5, 6, and 8. The base station beam manager 715 may include a monitoring pattern manager 720, a beam transmission manager 725, a measurement manager 730, a pattern override manager 735, and a configuration manager 740. Each of these modules may communicate, directly or indirectly, with one another (e.g., via one or more buses).

The monitoring pattern manager 720 may identify a first beam monitoring pattern for transmitting control channel transmissions, the first beam monitoring pattern indicating that the control channel transmissions are to be transmitted using a first subset of transmission beams in a first subset of time periods and that the control channel transmissions are to be transmitted using a second subset of transmission beams in a second subset of time periods. In some cases, the first beam monitoring pattern is selected from a set of available beam monitoring patterns based on channel conditions between the UE and the base station, and a second beam monitoring pattern is selected from a set of override beam monitoring patterns.

In some cases, the second beam monitoring pattern is used when continuing transmissions using the first subset of transmission beams for at least the portion of the second subset of time periods. In some cases, the first subset of transmission beams includes a first transmission beam and the second subset of transmission beams includes a second transmission beam, and where the second transmission beam is a weaker transmission beam than the first transmission beam. In some cases, the control channel transmissions transmitted using the second transmission beam are transmitted at a higher power or a higher aggregation level relative to the control channel transmissions using the first transmission beam, or any combination thereof.

The beam transmission manager 725 may transmit the control channel transmissions during the first subset of time periods using the first subset of transmission beams. The measurement manager 730 may determine, during the first subset of time periods, that the transmitted first subset of transmission beams exceeds a reliability threshold. In some cases, the determining includes determining that a predetermined number of acknowledgments are received during the first subset of time periods, a signal quality of the first subset of transmission beams exceeds a signal quality threshold, or any combination thereof, and where an indication of the determination is transmitted to the UE.

The pattern override manager 735 may indicate that a configured beam monitoring pattern is to be overridden. In some cases, an indication that a first subset of transmission beams is to be continued may be signaled to a UE, and an acknowledgment may be received from the UE of the indication. In such cases, transmissions using the first subset of transmission beams may be continued for at least a portion of the second subset of time periods. In some cases, the determining includes receiving an indication from a UE that the transmitted first subset of transmission beams exceeds the reliability threshold and acknowledging receipt of the indication.

In some cases, the indication is received in a MAC CE or in UCI received from the UE. In some cases, the monitoring pattern may be overridden autonomously at the UE and at the base station. In some cases, the continuing transmissions using the first subset of transmission beams includes continuing transmissions using the first subset of transmission beams for an identified time duration, and resuming the first beam monitoring pattern after an expiration of the identified time duration. In some cases, the continuing transmissions using the first subset of transmission beams further includes determining, prior to the expiration of the identified time duration, that the transmitted first subset of transmission beams continue to exceed the reliability threshold, and continuing transmissions using the first subset of transmission beams for another of the identified time duration.

The configuration manager 740 may configure a UE with the first beam monitoring pattern and one or more parameters for making a determination to override use of the second subset of transmission beams of the beam monitoring pattern and continue to use the first subset of transmission beams for at least the portion of the second subset of time periods. In some cases, an indication may be transmitted to a UE that indicates the first subset of transmission beams is to be used for at least the portion of the second subset of time periods. In some cases, the configuration manager 740 may configure the UE to determine, during the first subset of time periods, whether the transmitted first subset of transmission beams exceeds the reliability threshold, and configure the UE to continue using the first subset of transmission beams for at least the portion of the second subset of time periods based on the determination.

In some cases, the configuration is provided to the UE semi-statically using control channel signaling such as radio resource control (RRC) signaling. In some cases, the indication indicates that the first subset of transmission beams is to be used for both the first subset and the second subset of time periods for an identified time duration. In some cases, the identified time duration is indicated with the indication or is preconfigured. In some cases, the indication is transmitted in a MAC CE or in DCI included with the control channel transmissions. In some cases, the configuring includes configuring the UE with a same or similar set of metrics as the base station for determining to continue using the first subset of transmission beams for at least the portion of the second subset of time periods.

Figure 8:
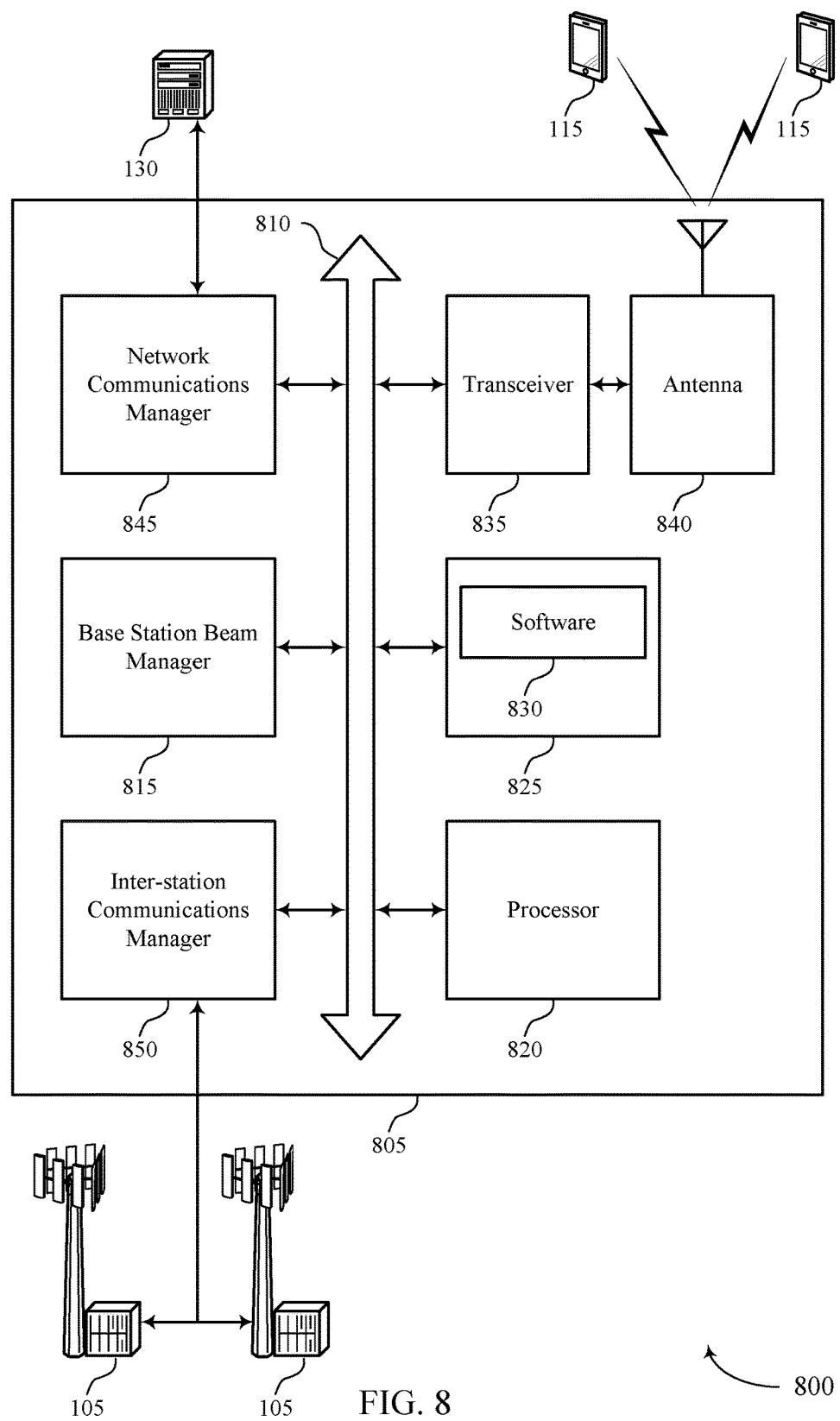
FIG. 8 illustrates a block diagram of a system including a base station that supports dynamic overriding of control beam monitoring configuration in accordance with aspects of the present disclosure.

FIG. 8 shows a diagram of a system 800 including a device 805 that supports dynamic overriding of control beam monitoring configuration in accordance with aspects of the present disclosure. The device 805 may be an example of or include the components of the wireless device 505, the wireless device 605, or a base station 105 as described above, e.g., with reference to FIGS. 5 and 6. The device 805 may include components for bi-directional voice and data communications including components for transmitting and receiving communications, including a base station beam manager 815, a processor 820, memory 825, software 830, a transceiver 835, an antenna 840, a network communications manager 845, and an inter-station communications manager 850. These components may be in electronic communication via one or more busses (e.g., bus 810). The device 805 may communicate wirelessly with one or more UEs 115.

The processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 820 may be configured to operate a memory array using a memory controller. In other cases, a memory controller may be integrated into the processor 820. The processor 820 may be configured to execute computer-readable instructions stored in a memory to perform various functions (e.g., functions or tasks supporting dynamic overriding of control beam monitoring configuration).

The memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

The software 830 may include code to implement aspects of the present disclosure, including code to support dynamic overriding of control beam monitoring configuration. The software 830 may be stored in a non-transitory computer-readable medium such as system memory or other memory. In some cases, the software 830 may not be directly executable by the processor but may cause a computer (e.g., when compiled and executed) to perform functions described herein.

The transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device 805 may include a single antenna 840. However, in some cases the device may have more than one antenna 840, which may be capable of concurrently transmitting or receiving multiple wireless transmissions.

The network communications manager 845 may manage communications with the core network (e.g., via one or more wired backhaul links). For example, the network communications manager 845 may manage the transfer of data communications for client devices, such as one or more UEs 115.

The inter-station communications manager 850 may manage communications with other base stations 105, and may include a controller or scheduler for controlling communications with the UEs 115 in cooperation with the other base stations 105. For example, the inter-station communications manager 850 may coordinate scheduling for transmissions to the UEs 115 for various interference mitigation techniques such as beamforming or joint transmission. In some examples, the inter-station communications manager 850 may provide an X2 interface within an LTE/LTE-A wireless communication network technology to provide communication between the base stations 105.

Figure 9:
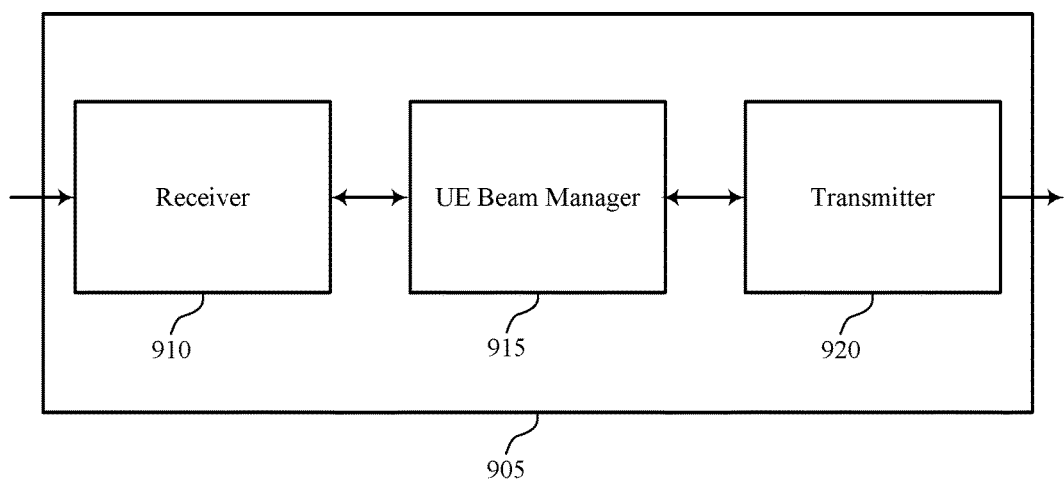
FIGS. 9 through 11 show block diagrams of a device that supports dynamic overriding of control beam monitoring configuration in accordance with aspects of the present disclosure.

FIG. 9 shows a block diagram 900 of a wireless device 905 that supports dynamic overriding of control beam monitoring configuration in accordance with aspects of the present disclosure. The wireless device 905 may be an example of aspects of a UE 115 as described herein. The wireless device 905 may include a receiver 910, a UE beam manager 915, and a transmitter 920. The wireless device 905 may also include a processor. Each of these components may be in communication with one another (e.g., via one or more buses).

The receiver 910 may receive information such as packets, user data, or control information associated with various information channels (e.g., control channels, data channels, and information related to dynamic overriding of control beam monitoring configuration, etc.). Information may be passed on to other components of the wireless device 905. The receiver 910 may be an example of aspects of the transceiver 1235 described with reference to FIG. 12. The receiver 910 may utilize a single antenna or a set of antennas.

The UE beam manager 915 may be an example of aspects of the UE beam manager 1215 described with reference to FIG. 12.

The UE beam manager 915 and/or at least some of its various sub-components may be implemented in hardware, software executed by a processor, firmware, or any combination thereof. If implemented in software executed by a processor, the functions of the UE beam manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE beam manager 915 and/or at least some of its various sub-components may be physically located at various positions, including being distributed such that portions of functions are implemented at different physical locations by one or more physical devices.

In some examples, the UE beam manager 915 and/or at least some of its various sub-components may be a separate and distinct component in accordance with various aspects of the present disclosure. In other examples, the UE beam manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The UE beam manager 915 may identify a beam monitoring pattern for monitoring control channel transmissions on transmission beams from a base station. In some examples, the beam monitoring pattern may indicate that the control channel transmissions are to be transmitted using a first subset of transmission beams in a first subset of time periods and using a second subset of transmission beams in a second subset of time periods. The UE beam manager 915 may also receive the control channel transmissions during the first subset of time periods over the first subset of transmission beams. The UE beam manager 915 may determine, during the first subset of time periods, that the transmitted first subset of transmission beams exceeds a reliability threshold, and continue receiving the control channel transmissions using the first subset of transmission beams for at least a portion of the second subset of time periods responsive to the determination.

The transmitter 920 may transmit signals generated by other components of the device. In some examples, the transmitter 920 may be collocated with the receiver 910 in a transceiver module. For example, the transmitter 920 may be an example of aspects of the transceiver 1235 described with reference to FIG. 12. The transmitter 920 may utilize a single antenna or a set of antennas.

Figure 10:
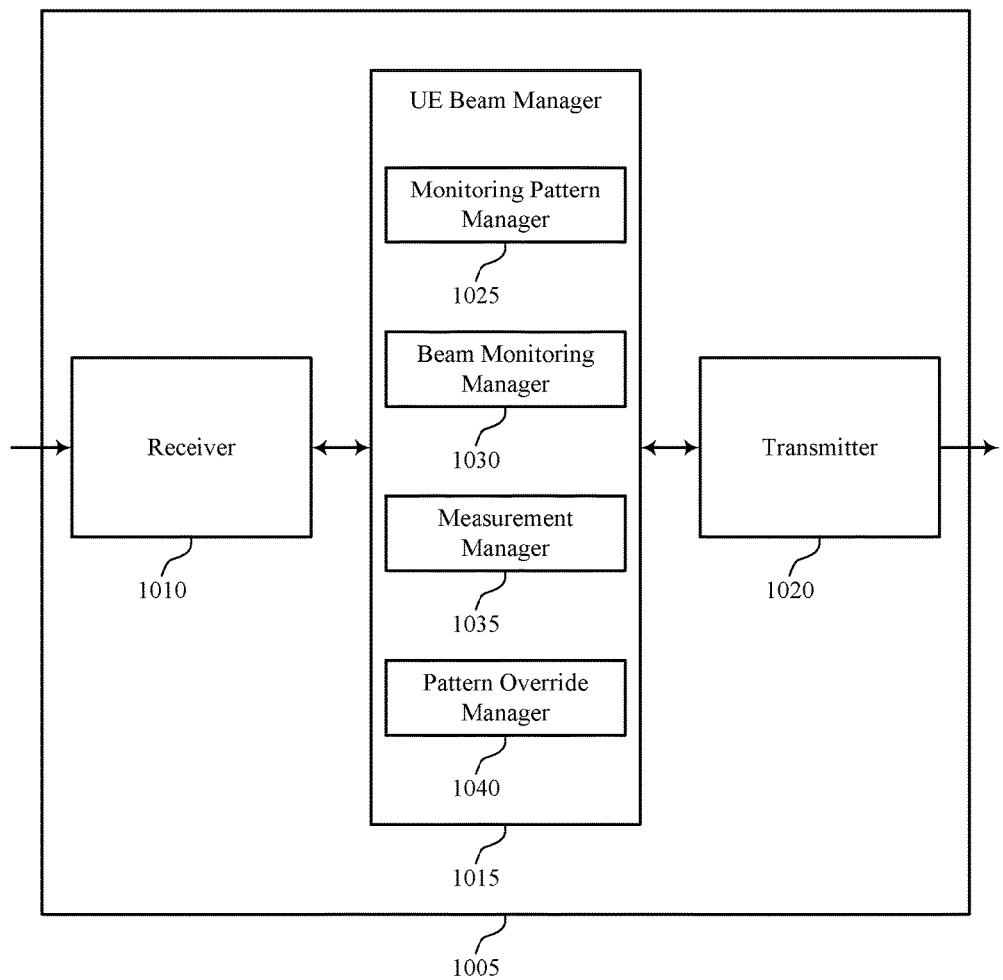

FIG. 10 shows a block diagram 1000 of a wireless device 1005 that supports dynamic overriding of control beam monitoring configuration in accordance with aspects of the present disclosure. The wireless device 1005 may be an example of aspects of a wireless device 905 or a UE 115 as described with reference to FIG. 9. The wireless device 1005 may include a receiver 1010, a UE beam manager 1015, and a transmitter 1020. The wireless device 1005 may also include a processor. Each of these components may be in communication with one another (e.g., via one or more buses).

The receiver 1010 may receive information such as packets, user data, or control information associated with various information channels (e.g., control channels, data channels, and information related to dynamic overriding of control beam monitoring configuration, etc.). The receiver 1010 may pass this and other information on to other components of the wireless device 1020. The receiver 1010 may be an example of aspects of the transceiver 1235 described with reference to FIG. 12. The receiver 1010 may utilize a single antenna or a set of antennas.

The UE beam manager 1015 may be an example of aspects of the UE beam manager 1215 described with reference to FIG. 12. The UE beam manager 1015 may also include a monitoring pattern manager 1025, a beam monitoring manager 1030, a measurement manager 1035, and a pattern override manager 1040.

The monitoring pattern manager 1025 may identify a beam monitoring pattern for monitoring control channel transmissions on transmission beams from a base station, the beam monitoring pattern indicating that the control channel transmissions are to be transmitted using a first subset of transmission beams in a first subset of time periods and that the control channel transmissions are to be transmitted using a second subset of transmission beams in a second subset of time periods.

The beam monitoring manager 1030 may receive the control channel transmissions during the first subset of time periods over the first subset of transmission beams.

The measurement manager 1035 may determine, during the first subset of time periods, that the transmitted first subset of transmission beams exceeds a reliability threshold. In some cases, the determining includes determining that a predetermined number of acknowledgments are received during the first subset of time periods determining that a signal quality of the first subset of transmission beams exceeds a signal quality threshold, or any combination thereof.

The pattern override manager 1040 may override a configured monitoring pattern and continue receiving the control channel transmissions using the first subset of transmission beams for at least a portion of the second subset of time periods. In some cases, an indication may be received from a base station that indicates the first subset of transmission beams is to be used for at least the portion of the second subset of time periods. In some cases, the indication indicates that the first subset of transmission beams is to be used for both the first subset and the second subset of time periods for an identified time duration. In some cases, the identified time duration is indicated with the indication or is preconfigured. In some cases, the indication is received in a MAC CE or in DCI included with the control channel transmissions.

In some cases, the wireless device 1005 may transmit an indication to the base station that the transmitted first subset of transmission beams exceeds the reliability threshold, and receive an acknowledgment of receipt of the indication, and where the continuing receiving the control channel transmissions using the first subset of transmission beams is performed responsive to receiving the acknowledgment. In some cases, the indication is transmitted in a MAC CE or in UCI. In some cases, the continuing receiving the control channel transmissions using the first subset of transmission beams includes continuing receiving the control channel transmissions using the first subset of transmission beams for an identified time duration, and resuming the first beam monitoring pattern after an expiration of the identified time duration. In some cases, the continuing receiving the control channel transmissions using the first subset of transmission beams further includes determining, prior to the expiration of the identified time duration, that the transmitted first subset of transmission beams continue to exceeds the reliability threshold, and continuing receiving the control channel transmissions using the first subset of transmission beams for another of the identified time duration.

The transmitter 1020 may transmit signals generated by other components of the wireless device 1005. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
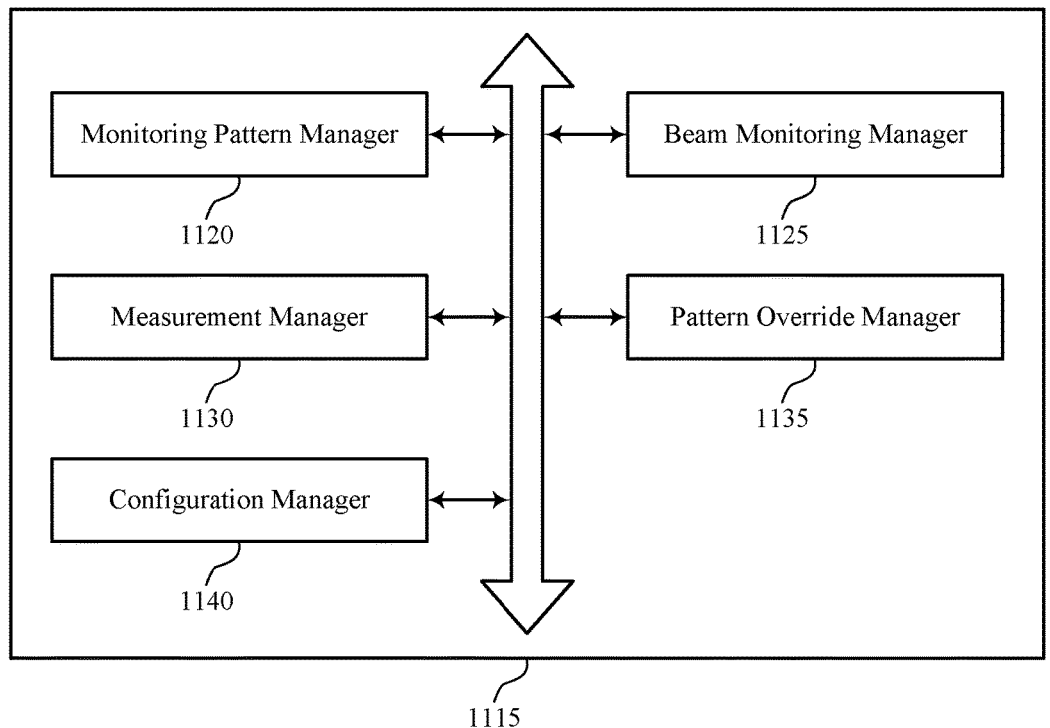

FIG. 11 shows a block diagram 1100 of a UE beam manager 1115 that supports dynamic overriding of control beam monitoring configuration in accordance with aspects of the present disclosure. The UE beam manager 1115 may be an example of aspects of a UE beam manager 1215 described with reference to FIGS. 9, 10, and 12. The UE beam manager 1115 may include a monitoring pattern manager 1120, a beam monitoring manager 1125, a measurement manager 1130, a pattern override manager 1135, and a configuration manager 1140. Each of these modules may communicate, directly or indirectly, with one another (e.g., via one or more buses).

The monitoring pattern manager 1120 may identify a beam monitoring pattern for monitoring control channel transmissions on transmission beams from a base station. The beam monitoring pattern may indicate that the control channel transmissions are to be transmitted using a first subset of transmission beams in a first subset of time periods and that the control channel transmissions are to be transmitted using a second subset of transmission beams in a second subset of time periods. In some cases, the first beam monitoring pattern maps the first subset of transmission beams to a first number of slots in the first subset of time periods and the second subset of transmission beams to a second number of slots in the second subset of time periods.

The beam monitoring manager 1125 may receive the control channel transmissions during the first subset of time periods over the first subset of transmission beams.

The measurement manager 1130 may determine, during the first subset of time periods, that the transmitted first subset of transmission beams exceeds a reliability threshold. In some cases, the determining includes determining that a predetermined number of acknowledgments are received during the first subset of time periods, determining that a signal quality of the first subset of transmission beams exceeds a signal quality threshold, or any combination thereof.

The pattern override manager 1135 may override a configured monitoring pattern and continue receiving the control channel transmissions using the first subset of transmission beams for at least a portion of the second subset of time periods. In some cases, an indication may be received from the base station that indicates the first subset of transmission beams is to be used for at least the portion of the second subset of time periods. In some cases, the indication indicates that the first subset of transmission beams is to be used for both the first subset and the second subset of time periods for an identified time duration. In some cases, the identified time duration is indicated with the indication or is preconfigured. In some cases, the indication is received in a MAC CE or in DCI included with the control channel transmissions.

In some cases, the wireless device 1115 may transmit an indication to the base station that the transmitted first subset of transmission beams exceeds the reliability threshold, and receive an acknowledgment of receipt of the indication, and where the continuing receiving the control channel transmissions using the first subset of transmission beams is performed responsive to receiving the acknowledgment. In some cases, the indication is transmitted in a MAC CE or in UCI. In some cases, the continuing receiving the control channel transmissions using the first subset of transmission beams includes continuing receiving the control channel transmissions using the first subset of transmission beams for an identified time duration, and resuming the first beam monitoring pattern after an expiration of the identified time duration. In some cases, the continuing receiving the control channel transmissions using the first subset of transmission beams further includes determining, prior to the expiration of the identified time duration, that the transmitted first subset of transmission beams continue to exceed the reliability threshold, and continuing receiving the control channel transmissions using the first subset of transmission beams for another of the identified time duration.

The configuration manager 1140 may receive configuration information with the first beam monitoring pattern and one or more parameters for making a determination to override use of the second subset of transmission beams of the beam monitoring pattern and continue to use the first subset of transmission beams for at least the portion of the second subset of time periods. In some cases, the configuration manager 1140 may receive, from the base station, configuration information to determine, during the first subset of time periods, whether the transmitted first subset of transmission beams exceeds the reliability threshold, and to continue using the first subset of transmission beams for at least the portion of the second subset of time periods based on the determination. In some cases, the continuing receiving the control channel transmissions using the first subset of transmission beams is performed autonomously at the base station and at the wireless device 1115. In some cases, the configuration is received semi-statically using control channel signaling such as RRC signaling.

Figure 12:
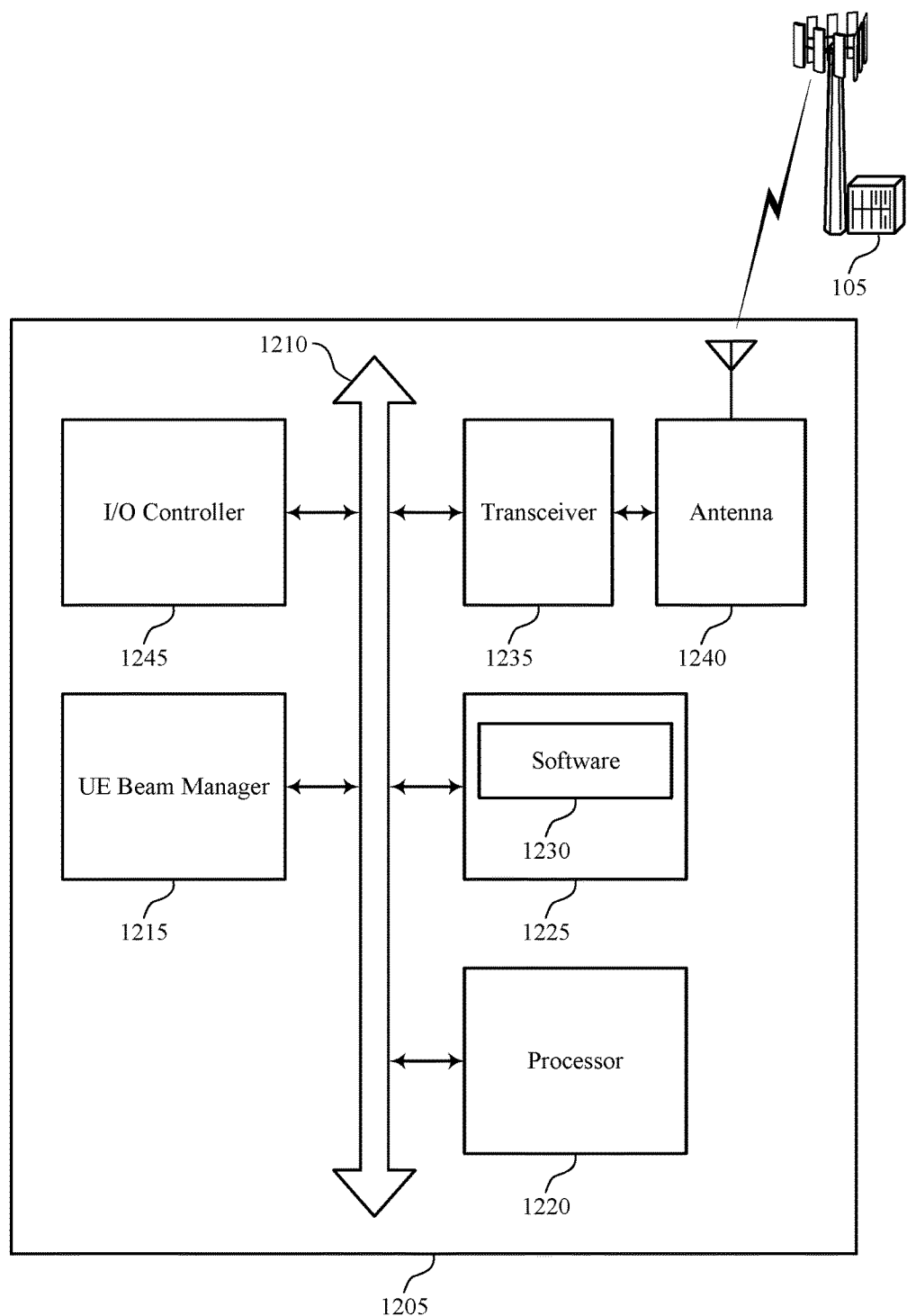
FIG. 12 illustrates a block diagram of a system including a UE that supports dynamic overriding of control beam monitoring configuration in accordance with aspects of the present disclosure.

FIG. 12 shows a diagram of a system 1200 including a device 1205 that supports dynamic overriding of control beam monitoring configuration in accordance with aspects of the present disclosure. The device 1205 may be an example of or include the components of UE 115 as described above, e.g., with reference to FIG. 1. The device 1205 may include components for bi-directional voice and data communications including components for transmitting and receiving communications, including a UE beam manager 1215, a processor 1220, memory 1225, software 1230, a transceiver 1235, an antenna 1240, and an I/O controller 1245. These components may be in electronic communication via one or more busses (e.g., bus 1210). The device 1205 may communicate wirelessly with one or more base stations 105.

The processor 1220 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1220 may be configured to operate a memory array using a memory controller. In other cases, a memory controller may be integrated into the processor 1220. The processor 1220 may be configured to execute computer-readable instructions stored in a memory to perform various functions (e.g., functions or tasks supporting dynamic overriding of control beam monitoring configuration).

The memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

The software 1230 may include code to implement aspects of the present disclosure, including code to support dynamic overriding of control beam monitoring configuration. The software 1230 may be stored in a non-transitory computer-readable medium such as system memory or other memory. In some cases, the software 1230 may not be directly executable by the processor but may cause a computer (e.g., when compiled and executed) to perform functions described herein.

The transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the device 1205 may include a single antenna 1240. However, in some cases the device 1205 may have more than one antenna 1240, which may be capable of concurrently transmitting or receiving multiple wireless transmissions.

The I/O controller 1245 may manage input and output signals for the device 1205. The I/O controller 1245 may also manage peripherals not integrated into the device 1205. In some cases, the I/O controller 1245 may represent a physical connection or port to an external peripheral. In some cases, the I/O controller 1245 may utilize an operating system such as iOS®, ANDROID®, MS-DOS®, MS-WINDOWS®, OS/2®, UNIX®, LINUX®, or another known operating system. In other cases, the I/O controller 1245 may represent or interact with a modem, a keyboard, a mouse, a touchscreen, or a similar device. In some cases, the I/O controller 1245 may be implemented as part of a processor. In some cases, a user may interact with the device 1205 via the I/O controller 1245 or via hardware components controlled by the I/O controller 1245.

Figure 13:
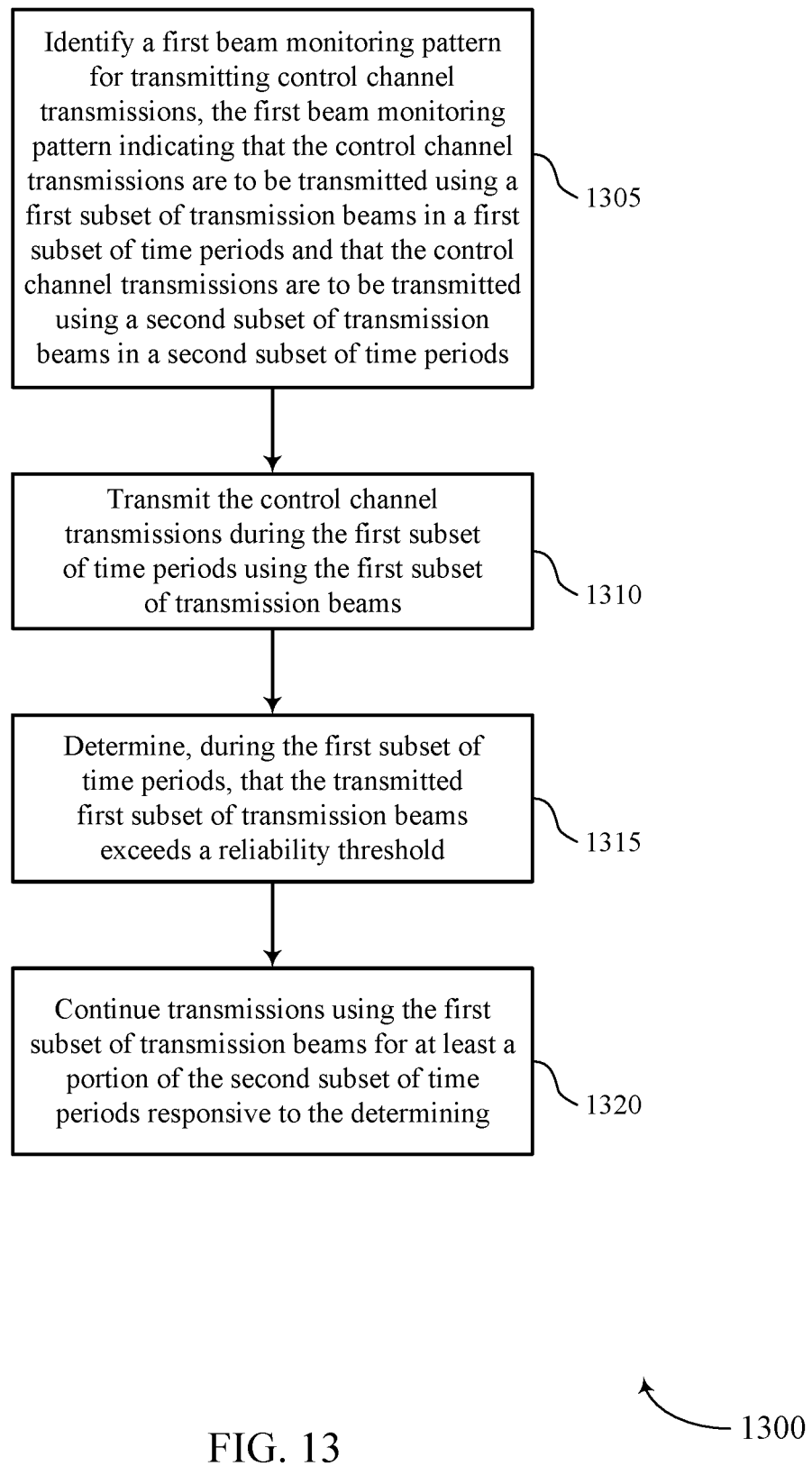
FIGS. 13 through 16 illustrate methods for dynamic overriding of control beam monitoring configuration in accordance with aspects of the present disclosure.

FIG. 13 shows a flowchart illustrating a method 1300 for dynamic overriding of control beam monitoring configuration in accordance with aspects of the present disclosure. The operations of method 1300 may be implemented by a base station 105 or its components as described herein. For example, the operations of method 1300 may be performed by a base station beam manager as described with reference to FIGS. 5 through 8. In some examples, a base station 105 may execute a set of codes to control the functional elements of a device to perform the functions described below. Additionally or alternatively, the base station 105 may perform aspects of the functions described below using special-purpose hardware.

At block 1305, the base station 105 may identify a first beam monitoring pattern for transmitting control channel transmissions, the first beam monitoring pattern indicating that the control channel transmissions are to be transmitted using a first subset of transmission beams in a first subset of time periods and that the control channel transmissions are to be transmitted using a second subset of transmission beams in a second subset of time periods. The operations of block 1305 may be performed according to the methods described herein. In certain examples, aspects of the operations of block 1305 may be performed by a monitoring pattern manager as described with reference to FIGS. 5 through 8.

At block 1310, the base station 105 may transmit the control channel transmissions during the first subset of time periods using the first subset of transmission beams. The operations of block 1310 may be performed according to the methods described herein. In certain examples, aspects of the operations of block 1310 may be performed by a beam transmission manager as described with reference to FIGS. 5 through 8.

At block 1315, the base station 105 may determine, during the first subset of time periods, that the transmitted first subset of transmission beams exceeds a reliability threshold. The operations of block 1315 may be performed according to the methods described herein. In certain examples, aspects of the operations of block 1315 may be performed by a measurement manager as described with reference to FIGS. 5 through 8.

At block 1320, the base station 105 may continue transmissions using the first subset of transmission beams for at least a portion of the second subset of time periods responsive to the determining. The operations of block 1320 may be performed according to the methods described herein. In certain examples, aspects of the operations of block 1320 may be performed by a pattern override manager as described with reference to FIGS. 5 through 8.

In some examples, the method 1300 may include determining, during the first subset of time periods, that the transmitted first subset of transmission beams does not exceed a reliability threshold. The method 1300 may also include identifying a second beam monitoring pattern for transmitting control channel transmissions, the second beam monitoring pattern indicating that the control channel transmissions are to be transmitted using a third subset of transmission beams in a third subset of time periods and that the control channel transmissions are to be transmitted using a fourth subset of transmission beams in a fourth subset of time periods. The method 1300 may also include overriding the first beam monitoring pattern with the second beam monitoring pattern.

Figure 14:
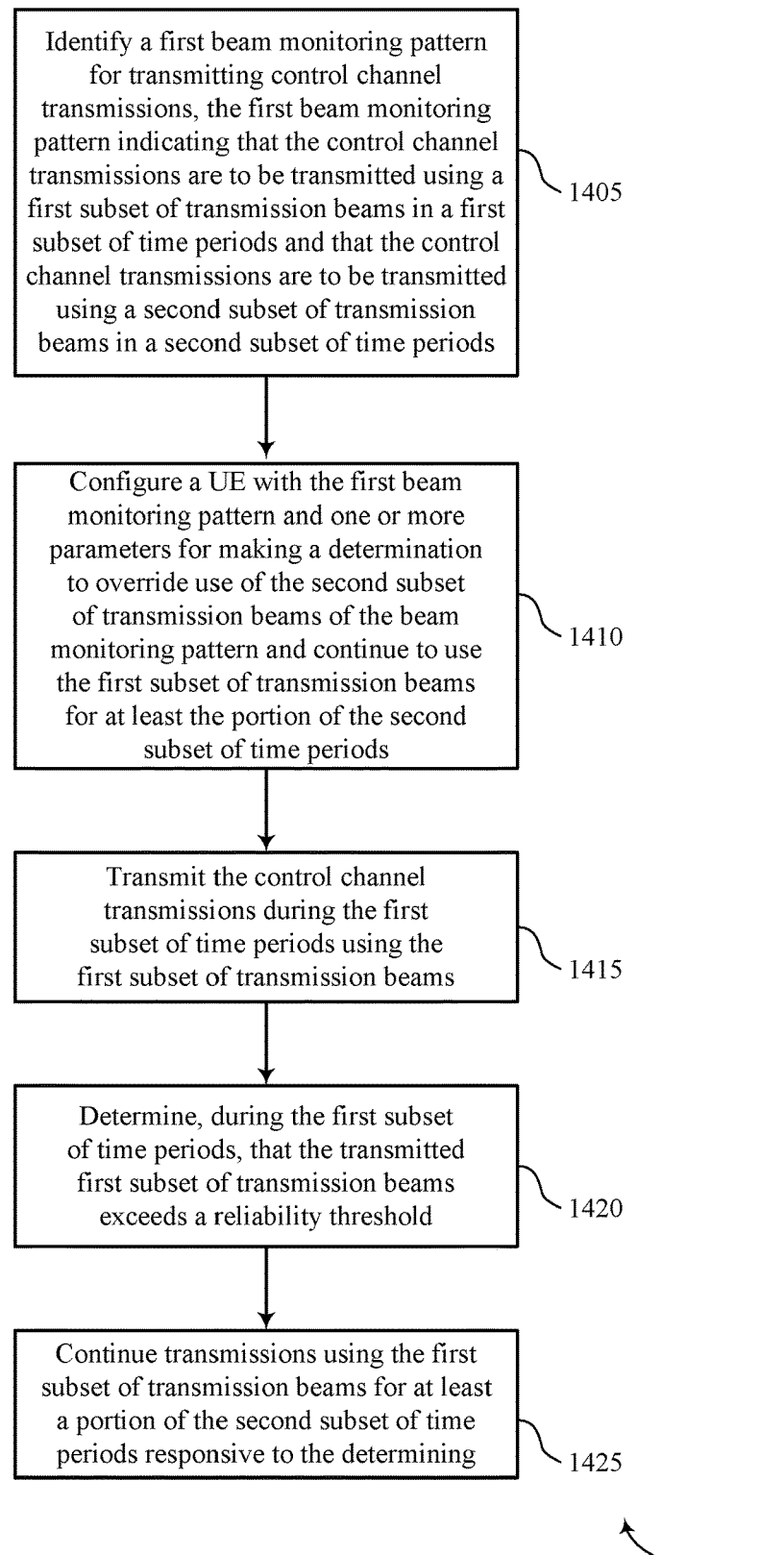

FIG. 14 shows a flowchart illustrating a method 1400 for dynamic overriding of control beam monitoring configuration in accordance with aspects of the present disclosure. The operations of method 1400 may be implemented by a base station 105 or its components as described herein. For example, the operations of method 1400 may be performed by a base station beam manager as described with reference to FIGS. 5 through 8. In some examples, a base station 105 may execute a set of codes to control the functional elements of a device to perform the functions described below. Additionally or alternatively, the base station 105 may perform aspects of the functions described below using special-purpose hardware.

At block 1405, the base station 105 may identify a first beam monitoring pattern for transmitting control channel transmissions, the first beam monitoring pattern indicating that the control channel transmissions are to be transmitted using a first subset of transmission beams in a first subset of time periods and that the control channel transmissions are to be transmitted using a second subset of transmission beams in a second subset of time periods. The operations of block 1405 may be performed according to the methods described herein. In certain examples, aspects of the operations of block 1405 may be performed by a monitoring pattern manager as described with reference to FIGS. 5 through 8.

At block 1410, the base station 105 may configure a UE with the first beam monitoring pattern and one or more parameters for making a determination to override use of the second subset of transmission beams of the beam monitoring pattern and continue to use the first subset of transmission beams for at least the portion of the second subset of time periods. The operations of block 1410 may be performed according to the methods described herein. In certain examples, aspects of the operations of block 1410 may be performed by a configuration manager as described with reference to FIGS. 5 through 8.

At block 1415, the base station 105 may transmit the control channel transmissions during the first subset of time periods using the first subset of transmission beams. The operations of block 1415 may be performed according to the methods described herein. In certain examples, aspects of the operations of block 1415 may be performed by a beam transmission manager as described with reference to FIGS. 5 through 8.

At block 1420, the base station 105 may determine, during the first subset of time periods, that the transmitted first subset of transmission beams exceeds a reliability threshold. The operations of block 1420 may be performed according to the methods described herein. In certain examples, aspects of the operations of block 1420 may be performed by a measurement manager as described with reference to FIGS. 5 through 8.

At block 1425, the base station 105 may continue transmissions using the first subset of transmission beams for at least a portion of the second subset of time periods responsive to the determining. The operations of block 1425 may be performed according to the methods described herein. In certain examples, aspects of the operations of block 1425 may be performed by a pattern override manager as described with reference to FIGS. 5 through 8.

Figure 15:
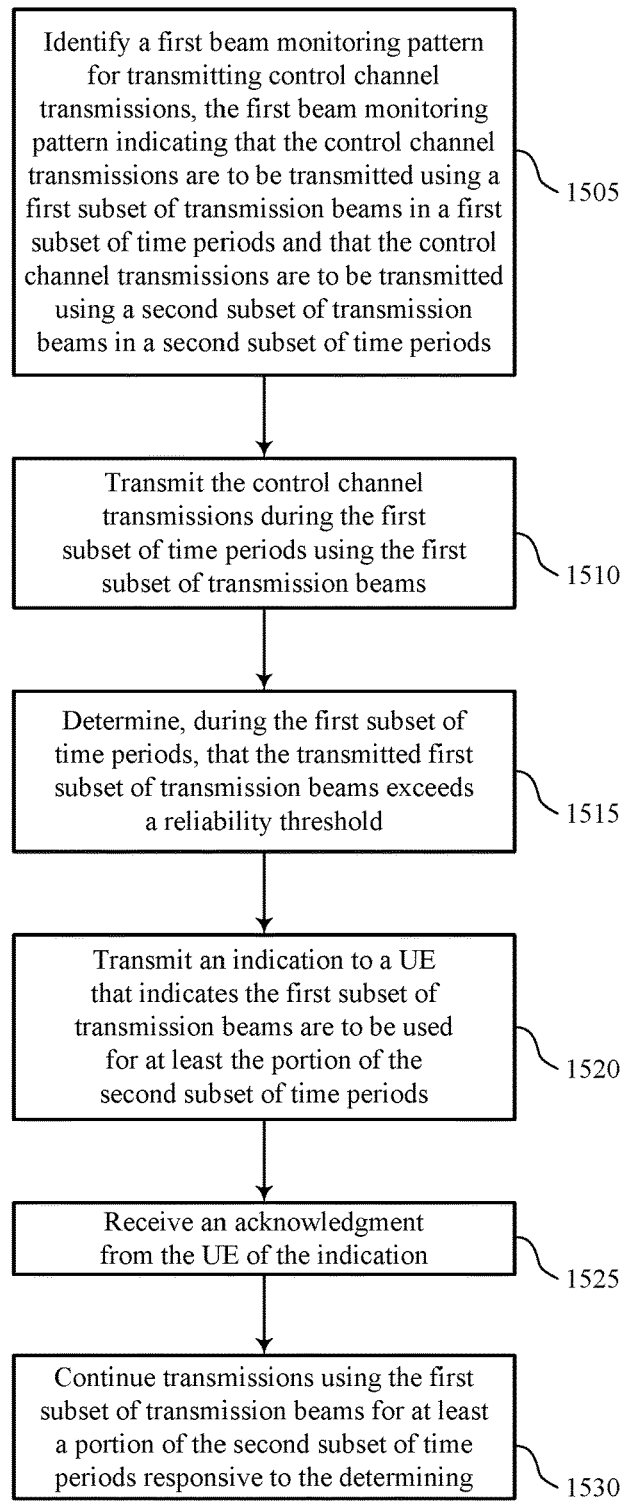

FIG. 15 shows a flowchart illustrating a method 1500 for dynamic overriding of control beam monitoring configuration in accordance with aspects of the present disclosure. The operations of method 1500 may be implemented by a base station 105 or its components as described herein. For example, the operations of the method 1500 may be performed by a base station beam manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1505, the base station 105 may identify a first beam monitoring pattern for transmitting control channel transmissions, the first beam monitoring pattern indicating that the control channel transmissions are to be transmitted using a first subset of transmission beams in a first subset of time periods and that the control channel transmissions are to be transmitted using a second subset of transmission beams in a second subset of time periods. The operations of block 1505 may be performed according to the methods described herein. In certain examples, aspects of the operations of block 1505 may be performed by a monitoring pattern manager as described with reference to FIGS. 5 through 8.

At block 1510, the base station 105 may transmit the control channel transmissions during the first subset of time periods using the first subset of transmission beams. The operations of block 1510 may be performed according to the methods described herein. In certain examples, aspects of the operations of block 1510 may be performed by a beam transmission manager as described with reference to FIGS. 5 through 8.

At block 1515, the base station 105 may determine, during the first subset of time periods, that the transmitted first subset of transmission beams exceeds a reliability threshold. The operations of block 1515 may be performed according to the methods described herein. In certain examples, aspects of the operations of block 1515 may be performed by a measurement manager as described with reference to FIGS. 5 through 8.

At block 1520, the base station 105 may transmit an indication to a UE that indicates the first subset of transmission beams is to be used for at least the portion of the second subset of time periods. The operations of block 1520 may be performed according to the methods described herein. In certain examples, aspects of the operations of block 1520 may be performed by a configuration manager as described with reference to FIGS. 5 through 8.

At block 1525, the base station 105 may receive an acknowledgment from the UE of the indication. The operations of block 1525 may be performed according to the methods described herein. In certain examples, aspects of the operations of block 1525 may be performed by a pattern override manager as described with reference to FIGS. 5 through 8.

At block 1530, the base station 105 may continue transmissions using the first subset of transmission beams for at least a portion of the second subset of time periods responsive to the determining. The operations of block 1530 may be performed according to the methods described herein. In certain examples, aspects of the operations of block 1530 may be performed by a pattern override manager as described with reference to FIGS. 5 through 8.

In some examples, the method 1500 may include determining, during the first subset of time periods, that the transmitted first subset of transmission beams does not exceed a reliability threshold. The method 1500 may also include identifying a second beam monitoring pattern for transmitting control channel transmissions, the second beam monitoring pattern indicating that the control channel transmissions are to be transmitted using a third subset of transmission beams in a third subset of time periods and that the control channel transmissions are to be transmitted using a fourth subset of transmission beams in a fourth subset of time periods. The method 1500 may also include overriding the first beam monitoring pattern with the second beam monitoring pattern.

Figure 16:
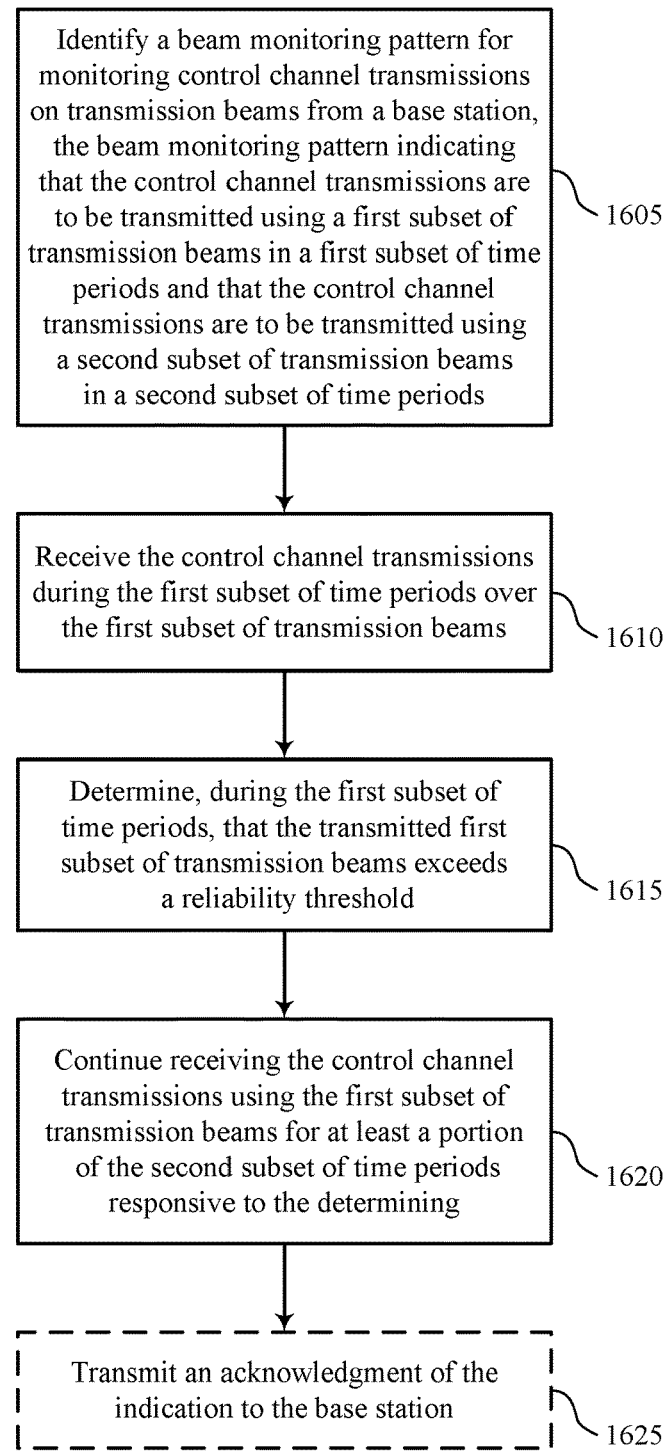

FIG. 16 shows a flowchart illustrating a method 1600 for dynamic overriding of control beam monitoring configuration in accordance with aspects of the present disclosure. The operations of method 1600 may be implemented by a UE 115 or its components as described herein. For example, the operations of the method 1600 may be performed by a UE beam manager as described with reference to FIGS. 9 through 12. In some examples, the UE 115 may execute a set of codes to control the functional elements of the device to perform the functions described below. Additionally or alternatively, the UE 115 may perform aspects of the functions described below using special-purpose hardware.

At block 1605, the UE 115 may identify a beam monitoring pattern for monitoring control channel transmissions on transmission beams from a base station, the beam monitoring pattern indicating that the control channel transmissions are to be transmitted using a first subset of transmission beams in a first subset of time periods and that the control channel transmissions are to be transmitted using a second subset of transmission beams in a second subset of time periods. The operations of block 1605 may be performed according to the methods described herein. In certain examples, aspects of the operations of block 1605 may be performed by a monitoring pattern manager as described with reference to FIGS. 9 through 12.

At block 1610, the UE 115 may receive the control channel transmissions during the first subset of time periods over the first subset of transmission beams. The operations of block 1610 may be performed according to the methods described herein. In certain examples, aspects of the operations of block 1610 may be performed by a beam monitoring manager as described with reference to FIGS. 9 through 12.

At block 1615, the UE 115 may determine, during the first subset of time periods, that the transmitted first subset of transmission beams exceeds a reliability threshold. The operations of block 1615 may be performed according to the methods described herein. In certain examples, aspects of the operations of block 1615 may be performed by a measurement manager as described with reference to FIGS. 9 through 12.

At block 1620, the UE 115 may continue receiving the control channel transmissions using the first subset of transmission beams for at least a portion of the second subset of time periods responsive to the determining. The operations of block 1620 may be performed according to the methods described herein. In certain examples, aspects of the operations of block 1620 may be performed by a pattern override manager as described with reference to FIGS. 9 through 12.

At optional block 1625, the UE 115 may transmit an acknowledgment of the indication to the base station. The operations of block 1625 may be performed according to the methods described herein. In certain examples, aspects of the operations of block 1625 may be performed by a pattern override manager as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a first beam monitoring pattern for transmitting control channel transmissions, the first beam monitoring pattern indicating that the control channel transmissions are to be transmitted using a first subset of transmission beams in a first subset of time periods and that the control channel transmissions are to be transmitted using a second subset of transmission beams in a second subset of time periods;
transmitting the control channel transmissions during the first subset of time periods using the first subset of transmission beams;
determining, during the first subset of time periods, that the transmitted first subset of transmission beams exceeds a reliability threshold; and
continuing transmissions using the first subset of transmission beams for at least a portion of the second subset of time periods responsive to the determining.

2. The method of claim 1, further comprising:
transmitting an indication to a user equipment (UE) that indicates the first subset of transmission beams is to be used for at least the portion of the second subset of time periods.

3. The method of claim 2, wherein the indication indicates that the first subset of transmission beams is to be used for both the first subset and the second subset of time periods for an identified time duration.

4. The method of claim 3, wherein the identified time duration is indicated with the indication or is preconfigured.

5. The method of claim 3, wherein the indication is transmitted in a medium access control (MAC) control element (CE) or in downlink control information (DCI) included with the control channel transmissions, wherein the method further comprises:
receiving an acknowledgement from the UE of the indication.

6. The method of claim 1, wherein the first beam monitoring pattern maps the first subset of transmission beams to a first number of slots in the first subset of time periods and the second subset of transmission beams to a second number of slots in the second subset of time periods.

7. The method of claim 1, wherein the determining comprises:
determining that a predetermined number of acknowledgments are received during the first subset of time periods;
determining that a signal quality of the first subset of transmission beams exceeds a signal quality threshold; or any combination thereof.

8. The method of claim 1, wherein the determining comprises:
receiving an indication from a user equipment (UE) that the transmitted first subset of transmission beams exceeds the reliability threshold; and
acknowledging receipt of the indication.

9. The method of claim 8, wherein the indication is received in a medium access control (MAC) control element (CE) or in uplink control information (UCI) received from the UE.

10. The method of claim 1, further comprising:
configuring a UE to determine, during the first subset of time periods, whether the transmitted first subset of transmission beams exceeds the reliability threshold, and to continue using the first subset of transmission beams for at least the portion of the second subset of time periods based on the determination, and
wherein the continuing transmissions using the first subset of transmission beams is performed autonomously at the UE and at a base station.

11. The method of claim 10, wherein the configuring comprises:
configuring the UE with a same set of metrics as the base station for determining to continue using the first subset of transmission beams for at least the portion of the second subset of time periods.

12. The method of claim 1, wherein the continuing transmissions using the first subset of transmission beams comprises:
continuing transmissions using the first subset of transmission beams for an identified time duration; and
resuming the first beam monitoring pattern after an expiration of the identified time duration.

13. The method of claim 12, wherein the continuing transmissions using the first subset of transmission beams further comprises:
determining, prior to the expiration of the identified time duration, that the transmitted first subset of transmission beams continue to exceed the reliability threshold; and
continuing transmissions using the first subset of transmission beams for another of the identified time duration.

14. The method of claim 1, further comprising:
determining, during the first subset of time periods, that the transmitted first subset of transmission beams does not exceed a reliability threshold;
identifying a second beam monitoring pattern for transmitting control channel transmissions, the second beam monitoring pattern indicating that the control channel transmissions are to be transmitted using a third subset of transmission beams in a third subset of time periods and that the control channel transmissions are to be transmitted using a fourth subset of transmission beams in a fourth subset of time periods; and
overriding the first beam monitoring pattern with the second beam monitoring pattern.

15. An apparatus for wireless communication, comprising:
a processor;
memory in electronic communication with the processor; and
instructions stored in the memory and operable, when executed by the processor, to cause the apparatus to:
identify a first beam monitoring pattern for transmitting control channel transmissions, the first beam monitoring pattern indicating that the control channel transmissions are to be transmitted using a first subset of transmission beams in a first subset of time periods and that the control channel transmissions are to be transmitted using a second subset of transmission beams in a second subset of time periods;

transmit the control channel transmissions during the first subset of time periods using the first subset of transmission beams;

determine, during the first subset of time periods, that the transmitted first subset of transmission beams exceeds a reliability threshold; and continue transmissions using the first subset of transmission beams for at least a portion of the second subset of time periods responsive to the determining.

16. The apparatus of claim 15, wherein the instructions stored in the memory and operable, when executed by the processor, further cause the apparatus to:

transmit an indication to a user equipment (UE) that indicates the first subset of transmission beams is to be used for at least the portion of the second subset of time periods.

17. A method for wireless communication, comprising:

identifying a beam monitoring pattern for monitoring control channel transmissions on transmission beams from a base station, the beam monitoring pattern indicating that the control channel transmissions are to be transmitted using a first subset of transmission beams in a first subset of time periods and that the control channel transmissions are to be transmitted using a second subset of transmission beams in a second subset of time periods;

receiving the control channel transmissions during the first subset of time periods over the first subset of transmission beams;

determining, during the first subset of time periods, that the transmitted first subset of transmission beams exceeds a reliability threshold; and continuing receiving the control channel transmissions using the first subset of transmission beams for at least a portion of the second subset of time periods responsive to the determining.

18. The method of claim 17, wherein the determining comprises:

receiving an indication from the base station that indicates the first subset of transmission beams is to be used for at least the portion of the second subset of time periods.

19. The method of claim 18, wherein the indication indicates that the first subset of transmission beams is to be used for both the first subset and the second subset of time periods for an identified time duration.

20. The method of claim 19, wherein the identified time duration is indicated with the indication or is preconfigured.

21. The method of claim 19, wherein the indication is received in a medium access control (MAC) control element (CE) or in downlink control information (DCI) included with the control channel transmissions, and wherein the method further comprises:

transmitting an acknowledgement of the indication to the base station.

22. The method of claim 17, wherein the determining comprises:

determining that a predetermined number of acknowledgments are received during the first subset of time periods;

determining that a signal quality of the first subset of transmission beams exceeds a signal quality threshold; or any combination thereof.

23. The method of claim 17, wherein the determining comprises:

transmitting an indication to the base station that the transmitted first subset of transmission beams exceeds the reliability threshold; and receiving an acknowledgment of receipt of the indication, and wherein the continuing receiving the control channel transmissions using the first subset of transmission beams is performed responsive to receiving the acknowledgment.

24. The method of claim 23, wherein the indication is transmitted in a medium access control (MAC) control element (CE) or in uplink control information (UCI).

25. The method of claim 17, further comprising:

receiving, from the base station, configuration information to determine, during the first subset of time periods, whether the transmitted first subset of transmission beams exceeds the reliability threshold, and to continue using the first subset of transmission beams for at least the portion of the second subset of time periods based on the determination, and wherein the continuing receiving the control channel transmissions using the first subset of transmission beams is performed autonomously at the base station and at a UE.

26. The method of claim 17, wherein the continuing receiving the control channel transmissions using the first subset of transmission beams comprises:

continuing receiving the control channel transmissions using the first subset of transmission beams for an identified time duration; and resuming the beam monitoring pattern after an expiration of the identified time duration.

27. The method of claim 26, wherein the continuing receiving the control channel transmissions using the first subset of transmission beams further comprises:

determining, prior to the expiration of the identified time duration, that the transmitted first subset of transmission beams continue to exceed the reliability threshold; and continuing receiving the control channel transmissions using the first subset of transmission beams for another of the identified time duration.

28. The method of claim 17, further comprising:

determining, during the first subset of time periods, that the transmitted first subset of transmission beams does not exceed a reliability threshold;

identifying a second beam monitoring pattern for transmitting control channel transmissions, the second beam monitoring pattern indicating that the control channel transmissions are to be transmitted using a third subset of transmission beams in a third subset of time periods and that the control channel transmissions are to be transmitted using a fourth subset of transmission beams in a fourth subset of time periods; and overriding the beam monitoring pattern with the second beam monitoring pattern.

29. An apparatus for wireless communication, comprising:

a processor;

memory in electronic communication with the processor; and instructions stored in the memory and operable, when executed by the processor, to cause the apparatus to:

identify a beam monitoring pattern for monitoring control channel transmissions on transmission beams from a base station, the beam monitoring pattern indicating that the control channel transmissions are to be transmitted using a first subset of transmission beams in a first subset of time periods and that the control channel transmissions are to be transmitted using a second subset of transmission beams in a second subset of time periods;

receive the control channel transmissions during the first subset of time periods over the first subset of transmission beams;

determine, during the first subset of time periods, that the transmitted first subset of transmission beams exceeds a reliability threshold; and continue receiving the control channel transmissions using the first subset of transmission beams for at least a portion of the second subset of time periods responsive to the determining.

30. The apparatus of claim 29, wherein the instructions stored in the memory and operable, when executed by the processor, further cause the apparatus to:

receive an indication from the base station that indicates the first subset of transmission beams is to be used for at least the portion of the second subset of time periods.

* * * * *